United States Patent
Sano et al.

(10) Patent No.: US 6,431,257 B1
(45) Date of Patent: Aug. 13, 2002

(54) AIR CONDITIONING APPARATUS FOR VEHICLE

(75) Inventors: Masahiro Sano; Katsuichiro Tajima; Masaharu Onda; Kuniyoshi Takahashi; Kaoru Kamiyama, all of Tochigi (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 09/543,012

(22) Filed: Apr. 4, 2000

(30) Foreign Application Priority Data

| Oct. 6, 1999 | (JP) | 11-285769 |
| Oct. 6, 1999 | (JP) | 11-285774 |
| Oct. 14, 1999 | (JP) | 11-292892 |
| Oct. 18, 1999 | (JP) | 11-295576 |
| Oct. 18, 1999 | (JP) | 11-295621 |
| Oct. 18, 1999 | (JP) | 11-295687 |

(51) Int. Cl.[7] ............................................. B60H 1/00
(52) U.S. Cl. ...................... 165/42; 165/202; 454/69; 454/148
(58) Field of Search ..................... 165/41, 42, 43, 165/201, 202, 203, 204; 454/69, 142, 143, 146, 162, 165, 148

(56) References Cited

U.S. PATENT DOCUMENTS

| 3,208,368 A | * | 9/1965 | Peras .......................... 454/148 |
| 4,852,638 A |   | 8/1989 | Hildebrand et al. .......... 165/42 |
| 5,701,949 A |   | 12/1997 | Yamaguchi et al. .......... 165/42 |
| 6,093,096 A | * | 7/2000 | Miyata et al. ............ 454/165 X |

FOREIGN PATENT DOCUMENTS

| JP | 6-18018 | 3/1994 |
| JP | 6-18021 | 3/1994 |
| JP | 8-132852 | 5/1996 |
| JP | 8-282248 | 10/1996 |
| JP | 9-99725 | 4/1997 |
| JP | 9-123748 | 5/1997 |
| JP | 9-267620 | 10/1997 |
| JP | 10-297249 | 11/1998 |
| JP | 11-78482 | 3/1999 |
| JP | 11-99820 | 4/1999 |
| JP | 11-235921 | 8/1999 |
| JP | 11-254942 | 9/1999 |

* cited by examiner

Primary Examiner—Ljiljana Ciric
(74) Attorney, Agent, or Firm—Foley & Lardner

(57) ABSTRACT

An air conditioning unit for a vehicle has a unit case enclosing a blower fan, a cooling heat exchanger (evaporator) and a heating heat exchanger (heater core), and defining therein an air conditioning passage for conveying air from the blower fan through the cooling heat exchanger and the heating heat exchanger, to an upper outlet opening. The air conditioning passage has an upstream passage section extending downward on a first side of the blower fan to convey the air from the blower fan downward, an intermediate passage section extending under the blower fan in a first direction from the first side to a second side of the blower fan, and a downstream passage section extending upward on the second side of the blower fan to the upper outlet opening for directing the air over the blower fan in a second direction, opposite to the first direction, from the second side toward the first side (toward the passenger compartment of the vehicle).

36 Claims, 29 Drawing Sheets

AIR CONDITIONING APPARATUS FOR VEHICLE

BACKGROUND OF THE INVENTION

The present invention pertains to air conditioning and more specifically to an air conditioning unit suitable for motor vehicles.

Japanese Patent Kokai Publication H09(1997)-267620 discloses an air conditioner unit having therein a heat exchanger 703 for cooling, a heat exchanger 705 for heating and a blower fan 701, as shown in FIG. 29. This air conditioner unit is disposed between engine room (or engine compartment) and passenger compartment of a vehicle, at the middle in the width of the vehicle. In this air conditioner unit, the conditioned air flows upward along the rear wall of the air conditioner unit on the passenger compartment's side and then discharges into the passenger compartment 707 through an aperture 709. Therefore, there is formed, between the upward air passage along the rear wall on the passenger compartment' side and the rearward passage to the aperture 709*e*, a rearward bend which increases the resistance of the air flow and which makes it difficult to distribute the conditioned air uniformly among a center ventilation aperture and left and right side ventilation apertures.

Japanese Patent Kokai Publication No. H11(1999)-78482 discloses an air conditioner mounting structure employing an assembly method with a subassembly fixed to a steering member of a vehicle. This structure can cause trouble in a ventilation door due to strain produced in the air conditioner unit during assemblage.

SUMMARY OF THE INVENTION

It is an object of the present invention to provide an air conditioning apparatus which can reduce the air flow resistance.

It is another object of the present invention to provide an air conditioning apparatus which can distribute conditioned air uniformly between center ventilation apertures and (left and right) side ventilation apertures.

It is still another object of the present invention to provide an air conditioning apparatus advantageous for the accuracy of assembly.

It is still another object of the present invention to provide an air conditioning apparatus advantageous for the size reduction and compactness.

According to the present invention, an air conditioning apparatus for a vehicle, comprises:
  a blower fan;
  a cooling heat exchanger;
  a heating heat exchanger; and
  a unit case enclosing the blower fan, the cooling heat exchanger and the heating heat exchanger, and defining therein an air conditioning passage for conveying air from the blower fan through the cooling heat exchanger and the heating heat exchanger, to an upper outlet opening. The air conditioning passage comprises an upstream passage section extending downward on a first side (such as a passenger compartment's side) of the blower fan to convey the air from the blower fan downward, an intermediate passage section extending under the blower fan in a first direction from the first side to a second side of the blower fan, and a downstream passage section extending upward on the second side (such as an engine compartment's side) of the blower fan to the upper outlet opening for directing the air over the blower fan in a second direction from the second side toward the first side.

According to another aspect of the present invention, a heating heat exchanger extends from a far end to a near end toward a cooling heat exchanger, and a bypass passage is formed between the cooling heat exchanger and the near end of the heating heat exchange. An air mix door is arranged to open and close the bypass passage to control a proportion of bypass air flowing through the bypass passage bypassing the heating heat exchanger and a proportion of warm air passing through the heating heat exchanger.

According to still another aspect of the present invention, a unit case of an air conditioner unit comprises a drain reservoir located below a cooling heat exchanger and located between a first side wall of the case and an outlet side of the cooling heat exchanger. Moreover, the unit case comprises a partition separating the drain reservoir from an upstream passage section for conveying air from a blower fan to the cooling heat exchanger.

According to still another aspect of the present invention, a unit case of an air conditioner unit comprises a blower housing wall extending around a blower fan to a free end portion defining a blower outlet opening between a first side wall and the free end portion, for discharging the air from the blower fan into an upstream passage section of an air conditioning passage, an upper support bracket supporting an upper end of a cooling heat exchanger, and first and second housing support walls connecting the upper support bracket and the free end portion of the blower housing wall. The first housing support wall defines the upstream passage section with the first side wall. The second housing support wall extends from the upper support bracket toward a downstream passage section of the air conditioning passage to guide the air into the downstream passage section. According to still another aspect of the present invention, an air conditioning apparatus comprises an air filter disposed on an upstream side of a cooling heat exchanger. The air filter may comprise a filter frame having an upper side formed with an air inlet.

According to still another aspect of the present invention, an air conditioning apparatus comprises a slide door unit disposed between a cooling heat exchanger and a heating heat exchanger.

DETAILED DESCRIPTION OF THE INVENTION

FIGS. 1~5 show an air conditioner unit 3 in a first practical example according to a first embodiment of the present invention.

Figure 1:
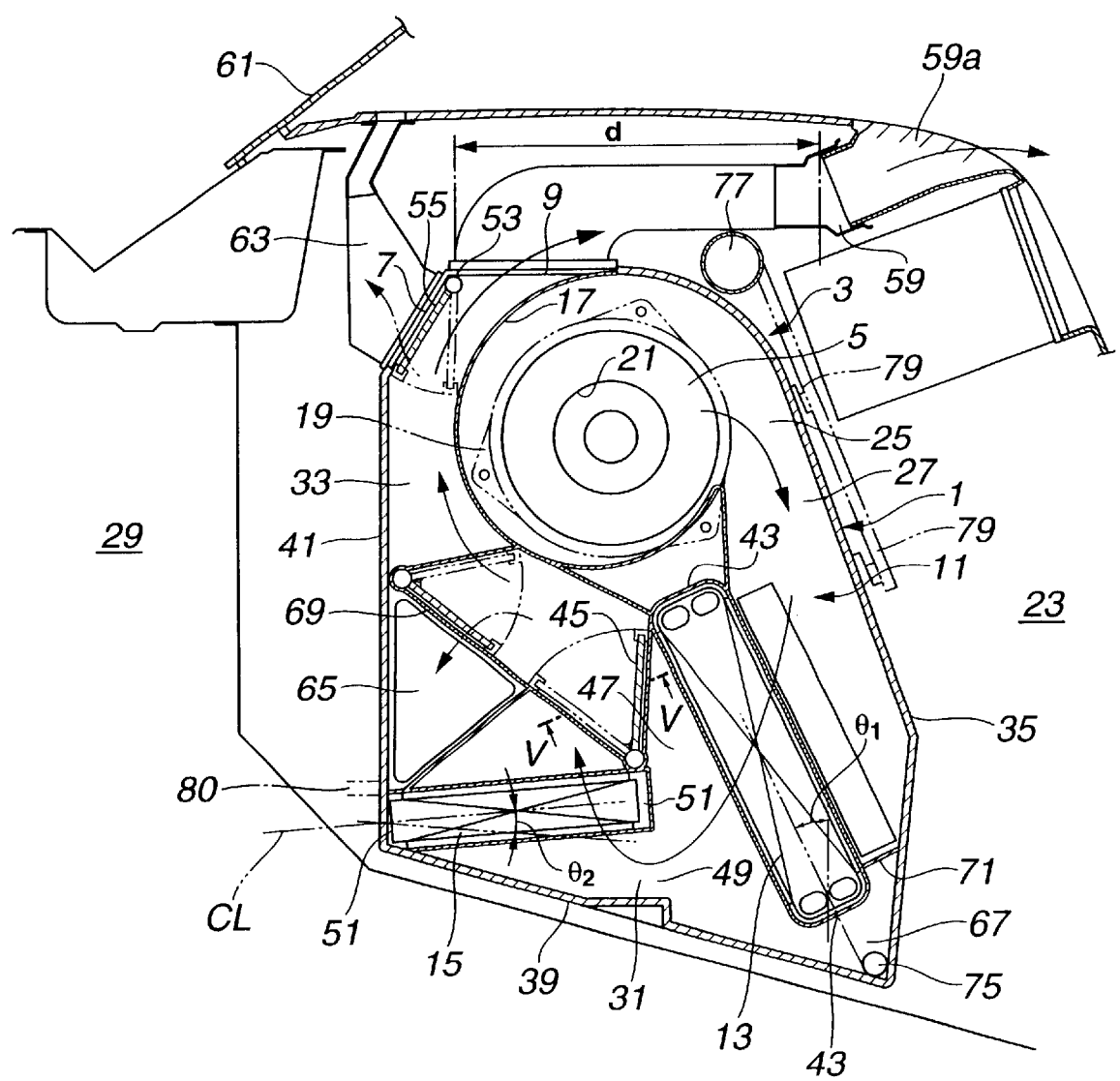
FIG. 1 is a sectional view of an air conditioning apparatus in a first practical example according to a first embodiment of the present invention.
Figure 2:
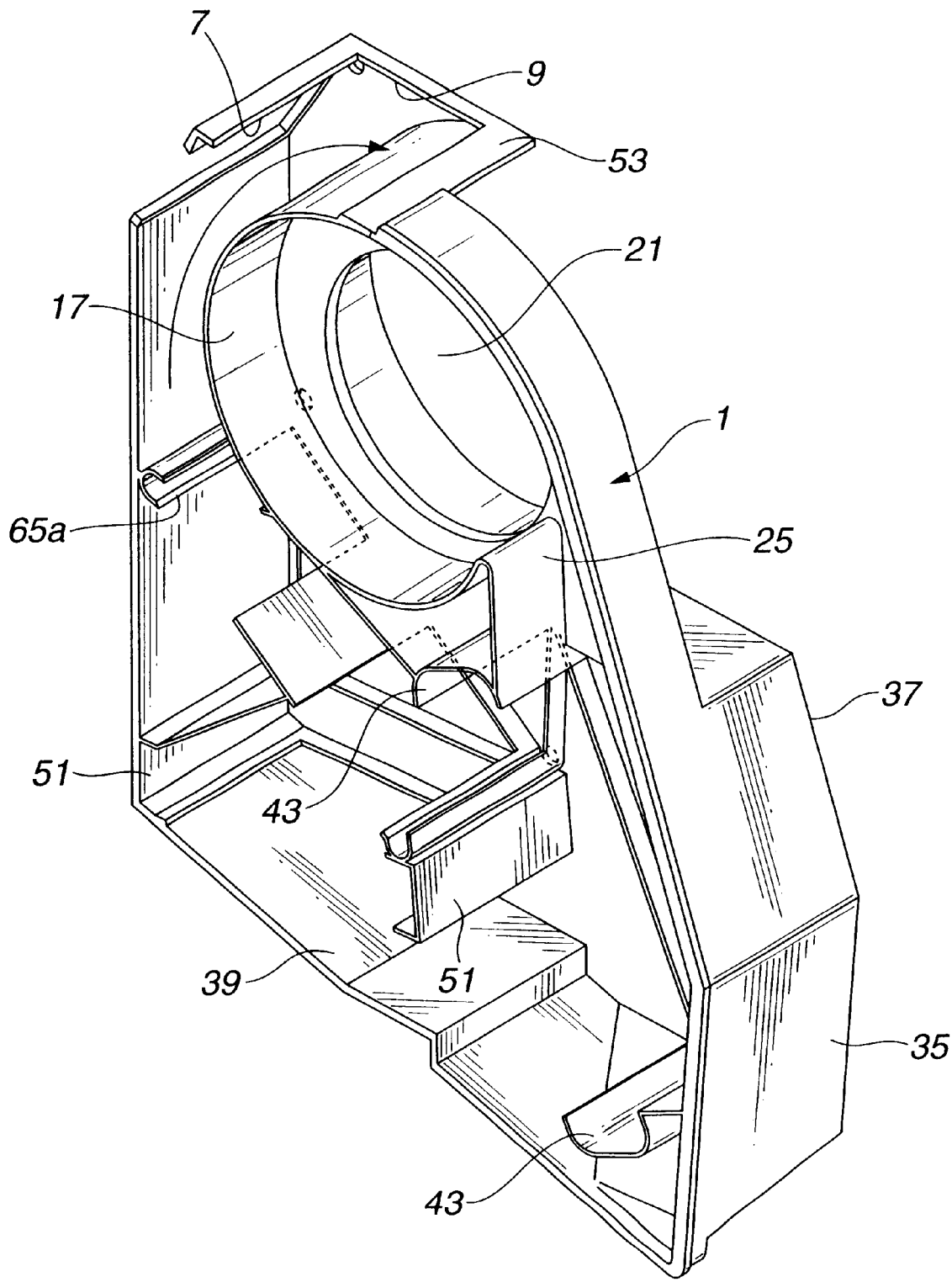
FIG. 2 is a schematic perspective view showing the inner structure of a unit case of an air conditioning unit of the air conditioning apparatus shown in FIG. 1.

A unit case 1 shown in FIG. 1 encases a blower fan 5, a cooling heat exchanger (evaporator) 13 and a heating heat exchanger (heater core) 15. An air conditioning passage 11 formed in the case 1 conveys air from the blower fan 5 to an upper outlet (7, 9) opened in the case 1. The heat exchangers 13 and 15 are disposed in the air conditioning passage 11. The air conditioning passage 11 extends so as to describe the shape of a letter U.

The blower fan 5 is installed in a blower housing or scroll housing 17 having a surrounding wall surrounding the blower fan 5. The surrounding wall of this example has a curved surface such as a cylindrical surface extending circumferentially around the blower fan 5. Driven by a blower motor 19, the blower fan 5 rotates and thereby moves air into the air conditioning passage 11.

The blower housing 17 has at least one air inlet opening 21 and an air outlet opening 25 opening into the air conditioning passage 11. By rotation of the blower fan 5, air is drawn axially from the inlet opening 21 at the center into the housing 17, and discharged through the outlet opening 25 defined by the surrounding wall.

The air conditioning passage 11 includes a downward passage (or upstream section) 27, a U-turn lower passage (or intermediate section) 31 and an upward passage (or downstream section) 33 which are all sections of the air conditioning passage 11, connected in series to form a single continuous path. The downward passage 27 extends downward continuously from the outlet opening 25 of the blower housing 17 on a first side region near a passenger compartment 23 of a vehicle. The U-turn lower passage 31 extends continuously from the downstream end of the downward passage 27 located in the first side region near the passenger compartment 23, to a second side region near an engine room (or engine compartment) 29 of the vehicle and turns the flow direction upward. The upward passage 33 extends upward continuously from the downstream end of the U-turn lower passage 31 to the upper outlet (7, 9) of the case 1.

The case 1 has a first side wall (or first end or rear wall) 35, a second side wall (or second end or front wall) 436, a lower (or bottom) wall 39, an upper wall 53, and left and right (or third and fourth) side walls 37.

The first side (rear) wall 35 has an outside surface facing the passenger compartment 23, and inside surface defining the downward passage 27 with the left and right walls 37.

The lower (bottom) wall 39 defines the lower U-turn passage 31 with the left and right side walls 37.

The second side (front) wall 41 has an outside surface facing toward the engine room 29, and an inside surface defining the upward passage 33 with the left and right walls 37 and the outside surface of the surrounding wall of the blower housing 17.

The cooling and heating heat exchangers 13 and 15 are disposed in the lower U-turn passage 31. The cooling heat exchanger 13 is located upstream of the heating heat exchanger 15.

The cooling heat exchanger 13 on the upstream side has therein a refrigerant pipe for refrigerant, and numbers of fins. The cooling heat exchanger 13 is supported in the case 1 by upper and lower support brackets 43. The cooling heat exchanger 13 is in an erecting or upright posture. In this example, the cooling heat exchanger 13 leans slightly toward the heating heat exchanger 15. The cooling heat exchanger 13 extends from an upper end to a lower end along an imaginary leaning center line which forms, with an imaginary vertical plane, a leaning angle θ1 of in the range from 0 to about 30°. Preferably, the leaning angle is equal to 20°. The upper end of the cooling heat exchanger 13 is located above the lower end and on the engine room's side of the lower end of the cooling heat exchanger 13. In this arrangement, the air from the outlet 25 of the blower housing 17 is introduced through the downward passage 27 into the cooling heat exchanger 13. In the cooling heat exchanger 13, the air can flow through interspaces among the fines in an effective manner following the specification standards, and thereby achieve an effective heat transfer for cooling.

The cooling heat exchanger 13 is a constituent member of a refrigeration cycle with a compressor, a condenser and an expansion valve. The refrigerant discharged from the compressor flows through the condenser and the expansion valve to the cooling heat exchanger 13 serving as an evaporator, and returns from the evaporator to the compressor.

The heating heat exchanger 15 is installed in a lying or (approximately) horizontal posture between the cooling heat exchanger 13 and the second side wall 41 so as to form a bypass passage 47 bypassing the heating heat exchanger 15 and a warm air passage 49 passing through the heating heat exchanger 15. The heating heat exchanger 15 is supported in the case 1 by front and rear support brackets 51. The heating heat exchanger 15 extends from a front end (or far end) to a rear end (or near end), toward an intermediate position of the cooling heat exchanger 13, along an imaginary sloping center line CL sloping upward. A sloping angle θ2 formed between the sloping center line CL and an imaginary reference horizontal plane is preferably in the range from 5° to 10°. The imaginary sloping center line CL of the heating heat exchanger 15 intersects the imaginary leaning center line of the cooling heat exchanger 13 at an intermediate position between the upper and lower ends of the cooling heat exchanger 13 so as to form the shape of a letter T. This laid-low-T-shaped arrangement helps decrease the vertical dimension of the layout of the heat exchangers 13 and 15.

The heating heat exchanger 15 is supplied with a water heated by the engine of the vehicle, and arranged to perform the heat exchange for heating, with air passing therethrough.

An air mix door 45 proportions the amount of air permitted to pass through the heating heat exchanger 15 by varying the opening sizes of the bypass passage 47 and the warm air passage 49. When in the position shown by a solid line in FIG. 1, the mix door 45 closes the bypass passage 47 and opens the warm air passage 49. In this state, all of the air from the cooling heat exchanger 13 is admitted to the heating heat exchanger 15 to gain a full hot mode. As the mix door 45 is controlled to swing toward the position shown by a chain line in FIG. 1, the mix door 45 varies the opening degree of the bypass passage 47 and thereby regulates the amount of the air passing through the heating heat exchanger 15 to control the temperature of the air conditioned air.

The upper outlet of the case 1 in this example includes first and second openings 7 and 9 which are formed collectively in an upper front corner (or upper second side corner) of the case 1 formed by the upper end portion of the second side wall 41 and the front end portion of the upper wall 53. In this example, the first opening 7 is formed in the upper end portion of the second side wall 41 and used as a defroster opening. The second opening 9 is formed in the front end portion of the upper wall 53, and used as a vent opening. At the middle between the first and second openings 7 and 9, there is provided a (ventilator/defroster) door 55 for opening and closing the first and second openings 7 and 9. The first and second openings 7 and 9 are separated by a transverse bar extending along the left and right direction (or the axial direction of the blower fan 5). The door 55 of this example is swingably supported on the transverse bar. This arrangement facilitates the installation of the door 55. The door 55 extends downward from the transverse bar to the downstream side of the upward passage 33.

Figure 3:
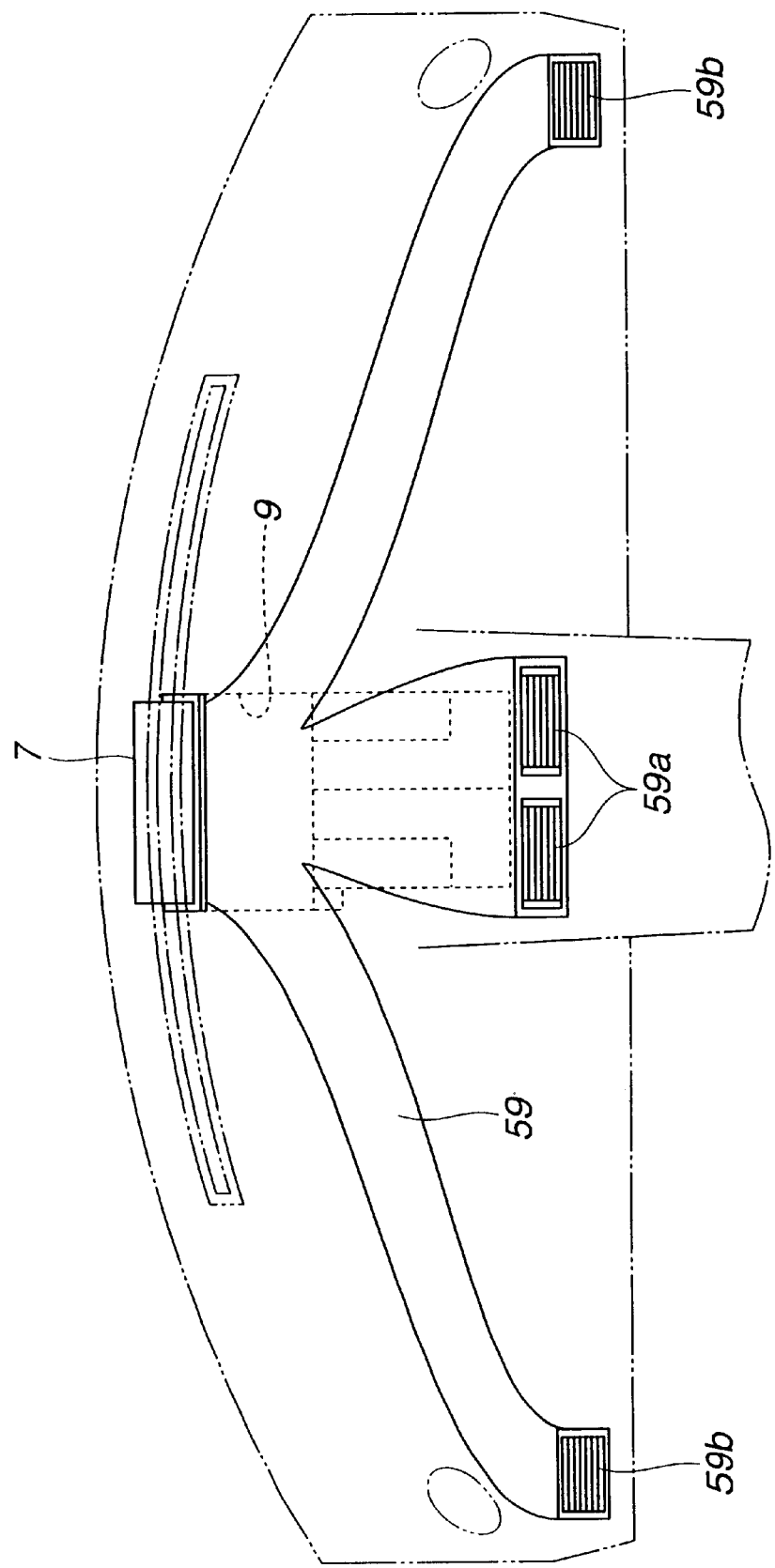
FIG. 3 is a schematic plan view showing a ventilator duct connected with an upper outlet opening of the air conditioning unit shown in FIG. 1.
Figure 4:
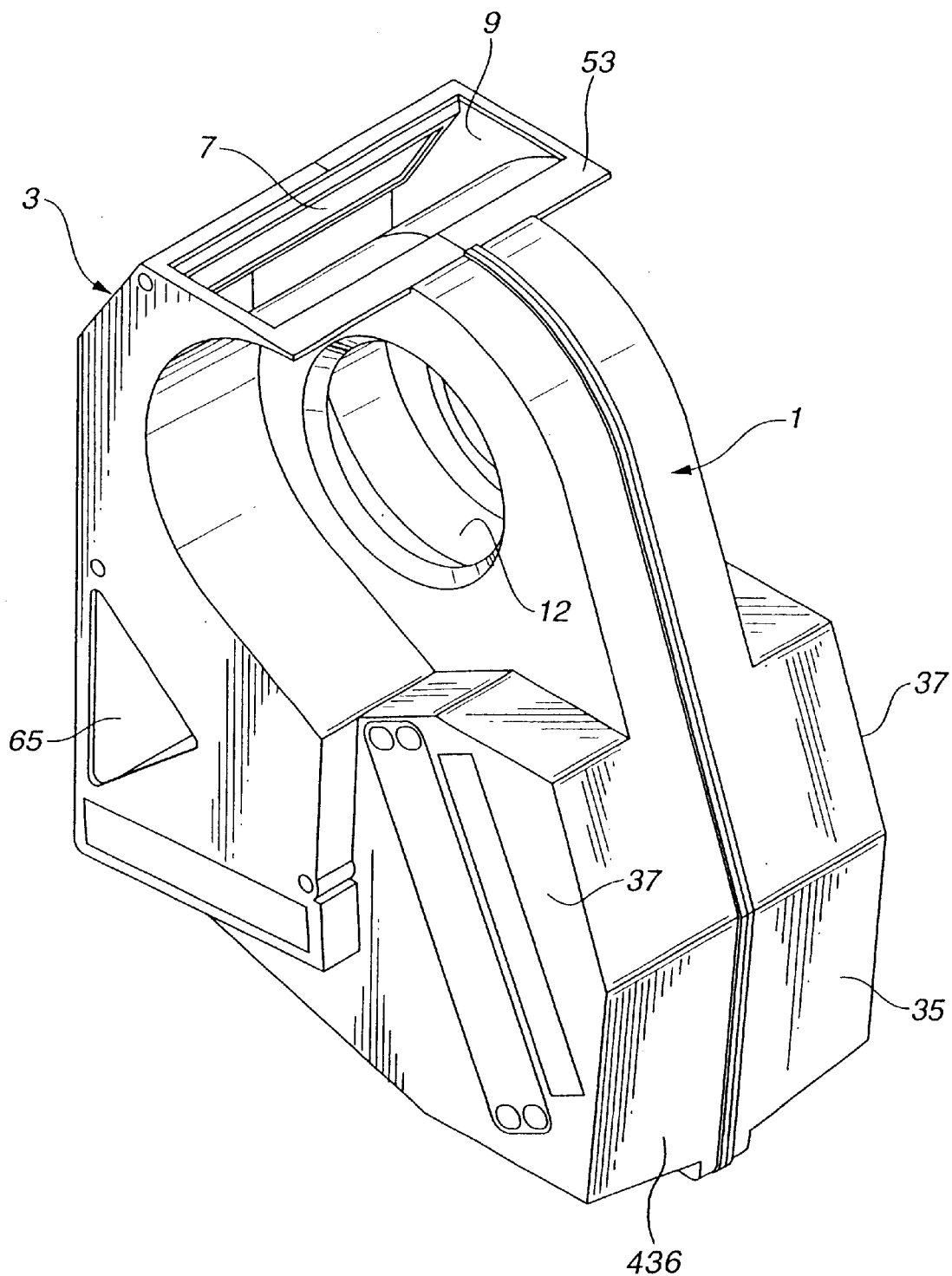
FIG. 4 is a schematic perspective view showing the air conditioning unit of FIG. 1.

The second upper outlet opening 9 as the vent opening is connected with a ventilator duct 59 having center and left and right side ventilation apertures 59a and 59b for ventilation in the passenger compartment, as shown in FIG. 3. In this example, the second upper opening 9 is located on the second (front) side of the axis of the blower fan 5.

The air conditioner unit 1 according to this embodiment can increase the distance d of an approach from the second upper outlet opening 9 to the center apertures 59a, as shown in FIG. 1. This layout is appropriate for distributing the air uniformly and smoothly among the center and left and right side apertures 59a and 59b.

The first upper outlet opening 7 as the defroster opening is connected with a defroster duct 63 for directing the air toward a windshield 61 of the vehicle. The first upper outlet opening 7 of this example is located on the second (front) side of the second upper outlet opening 9.

Figure 5:
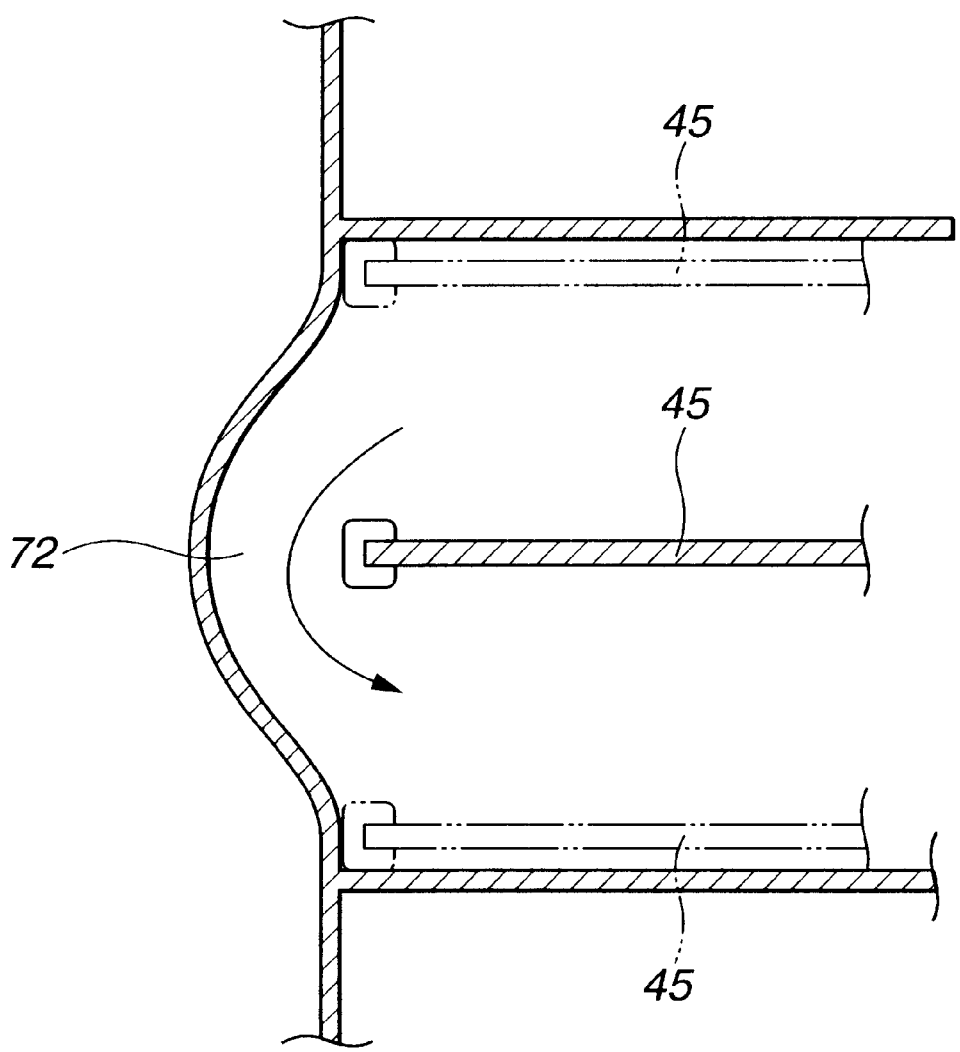
FIG. 5 is a sectional view taken across a line V—V of FIG. 1.

An intermediate passage 65 for directing the conditioned air toward one or more foot apertures extends along a transverse (or left and right) direction. An intermediate-foot door 69 is arranged to open and close an intermediate opening 65a opening into the intermediate transverse passage 65. When the foot door 69 and the mix door 45 are both in a half open position, the conditioned air flows smoothly, but the air through the bypass passage 47 does not flow smoothly into the opening 65a. Therefore, it is preferable to form a bypass passage 72 at one side (or each side) of the mix door 45 as shown in FIG. 5.

A drain reservoir 67 is formed in the lower first side (rear) corner of the case 1 between the lower end portion of the first side wall 35 and the first side (rear) end portion of the lower wall 39, as shown in FIG. 1. A partition wall 71 separates the drain reservoir 67 from the downward passage 27 so as to avoid direct influence from the air flow through the cooling heat exchanger 13. A drain opening 75 is formed at the deepest portion in the drain reservoir 67. In this example, the partition wall 71 is an extension of the lower support bracket 43 for supporting the lower end of the cooling heat exchanger 13.

The thus-constructed air conditioner unit 3 produces the conditioned air by causing the air discharged from the blower fan 5 to flow through the cooling heat exchanger 13 for cooling and through the heating heat exchanger 15 for heating. The conditioned air is introduced into the passenger compartment in a desired manner by controlling the positions of the doors 55 and 69.

The upper end section of the upward passage 33 on the engine room's side is bent smoothly along the curved outside surface of the surrounding wall of the blower housing 17, toward the passenger compartment's side, so that air streams flow smoothly toward the ventilation apertures 59a and 59b. Moreover, the long approach d up to the center ventilation apertures 59a is effective for producing smooth continuous air streams of low ventilation resistance, as shown in FIG. 1, and for supplying the conditioned air uniformly to the center and side ventilation apertures 59a and 59b.

The ventilator/defroster door 55 is placed in the far region remote from the passenger compartment 23, and the passenger compartment 23 is separated from the door 55 by the blower fan 5 and the downward passage 27 to the advantage of noise reduction. This arrangement helps reduce the noises of discharged air, and opening and closing operations of the door transmitted into the passenger compartment. In the case where the unit case 1 is supported at a single lower front support point 80 at a lower level on the front side, and at two rear support points 79 on the rear side for connection to a steering support member 77, as shown in FIG. 1, the door 55 is distant from the support points 79 and 80, so that the mount of the door 55 remains firm and ensures the smooth operation of the door 55 even if strains are produced due to the weight of the air conditioner unit and irregularities in the dimensions among the fastening portions of the air conditioner unit, the steering support member and the fastening portions of the vehicle body.

Figure 6:
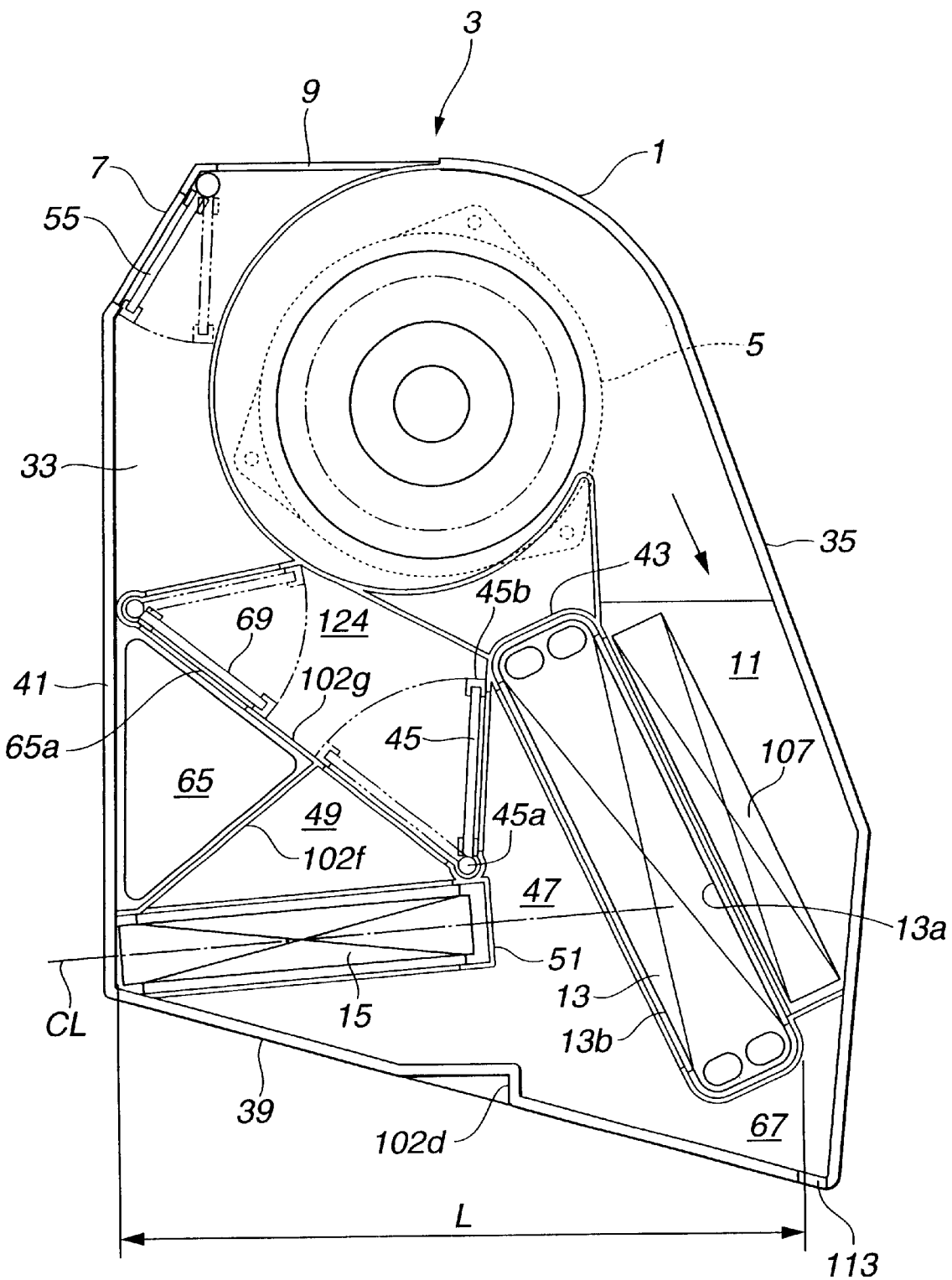
FIG. 6 is a sectional view showing an air conditioning unit in a second practical example according to the first embodiment of the present invention.

FIG. 6 is a view of an air conditioner unit in a second practical example according to the first embodiment of the present invention. This air conditioner unit is substantially identical to that of FIG. 1.

The blower housing 17 has a left side wall formed with the air inlet opening 21 for admitting outside air from the outside of the vehicle or inside air from the passenger compartment, and a right side wall with an opening for installing the blower fan 5.

The heating heat exchanger 15 is spaced from the cooling heat exchanger 13. The bypass passage 47 is formed between both heat exchangers 13 and 15. As shown in FIG. 6, an imaginary center line CL of the heating heat exchanger 15 along a widthwise direction extends toward the middle of the cooling heat exchanger 13 and intersects a downstream outlet face 13b of the cooling heat exchanger 13

The blower fan 5 may a centrifugal fan. In this example, the blower fan 5 is a sirocco fan.

An air filter 107 is disposed adjacently on the lo upstream side of the cooling heat exchanger 13, and arranged to remove dust and other foreign matter from the air stream entering the cooling heat exchanger 13. The filter 107 entirely covers an upstream inlet face 13a of the cooling heat exchanger 13.

The lower (bottom) wall 39 of the case 1 extends from the lower second side (front) corner of the case 1 formed by the lower end portion of the second side (front) wall 41 and the second side (front) end portion of the lower wall 39, to the lower first side (rear) corner formed by the lower end portion of the first side (rear) wall 35 and the first side (rear) end portion of the lower wall 39. In this example, the lower wall 39 slopes down from the lower second side (front) corner to the lower first side (rear) corner. The drain reservoir 67 formed in the lower first 5 side (rear) corer is designed to collect water resulting from dehumidification in the cooling heat exchanger 13. A drain hole 113 is formed in the deepest portion of the drain reservoir 67, to carry off the water out of the case 1. The lower (bottom) wall 39 of the case has a raised portion in the middle between the second side (front) end and the first side (rear) end of the lower wall 39. The raised portion has an embankment step 102d for holding back the water in the drain reservoir 67 in case of hard braking of the vehicle.

First and second guide walls 102f and 102g projects from the second side (front) wall 41 toward the first side (rear) wall 35, and define the intermediate passage 65 in the case 1. The first guide wall 102f defines the warm air passage 49 extending from the heating heat exchanger 15 to a confluence region (or air mix chamber) at which the bypass passage 47 and the warm air passage 49 join. The second guide wall defining a conditioned air passage extending from the confluence region to the upward passage 33. The first guide wall 102f projects along an upward sloping direction from a first base position on the second side wall 41 to an apex position toward the first side wall 35. The second guide wall 102g projects along a downward sloping direction from a second base position on the second side wall 41 to the apex position at which projecting ends of the first and second guide walls 102f and 102g are connected together. The second base position is located above the first base position. The second guide wall 102g is formed with an intermediate opening 65a opening into the intermediate air outlet passage 65 which are formed by the first and second guide walls 102f and 102g and the second side wall 41 within the case 1. In this example, the intermediate outlet passage 65 has a triangular cross section as shown in FIG. 6.

The air mix door 45 has a swing shaft 45a supported on an upper surface of a rear support member 51 for supporting the heating heat exchanger 13. The swing shaft 45a extends transversely along the left and right direction, at a position just above the near (rear) end of the heating heat exchanger 13. The air mix door 45 is swingable on the swing shaft 45a between a cool air position closing the warm air passage 49 and opening the bypass passage 47 and a warm air position opening the warm air passage 49 and closing the.bypass passage 47. The air mix door 45 has a swing end 45b provided with a seal member. The swing end 45b is located above the swing shaft 45a. When the air mix door 45 is in the cool air position closing the warm air passage 49 and opening the bypass passage 47, the swing end 45b abuts on the apex point between the first and second guide walls 102 and 102g in a sealing manner. In the warm air position, the swing end 45b of the air mix door 45 abuts, for sealing, on an upper end of a downstream side of a support member 43 for supporting the cooling heat exchanger 13. The first guide wall 102f guides the air along an upward oblique direction from the heating heat exchanger 15 to the swing region of the air mix door 45. The second guide wall 102g guide along an upward oblique direction from the swing region of the air mix door 45 toward the second side (front) wall 41.

On the downstream side of the air mix door 45, there is formed an air mix chamber (or conditioned air passage or confluence region) 124 for blending the cool air from the bypass passage 47 and the warm air from heating heat exchanger 15. The second guide wall 102g defines a lower boundary of the air mix chamber 124. The second guide wall 102g has the intermediate (foot) opening 65a opening into the intermediate outlet passage 65 formed by the first and second guide walls 102f and 102g and the second side (front) wall 41. The intermediate foot door 69 is swingable on a swing axis extending in the left and right transverse direction at the upper edge of the intermediate (foot) opening 65a between an open position closing the downstream end of the upward passage 33 and instead opening the intermediate opening 65a, and a closed position opening the upward passage 33 and closing the intermediate opening 65a. The swingable end of the intermediate foot door 69 is located on the downstream side of the swing axis of the intermediate door 69. In a position away from the closed position, the intermediate door 69 guides the air stream into the intermediate opening 65a.

The intermediate foot door 69 is controlled at the opening position for closing the upward passage 33 and connecting the air mix chamber 124 with the intermediate foot opening 65a in the case of a foot mode, and at a half open position in the case of a bi-level mode. The intermediate foot passage 65 forms a part of a foot duct for distributing the conditioned air toward the feet of a passenger. The intermediate foot passage 65 extends transversely and has left and right open ends, respectively, formed in the left and right side walls of the case 1.

Figure 29:
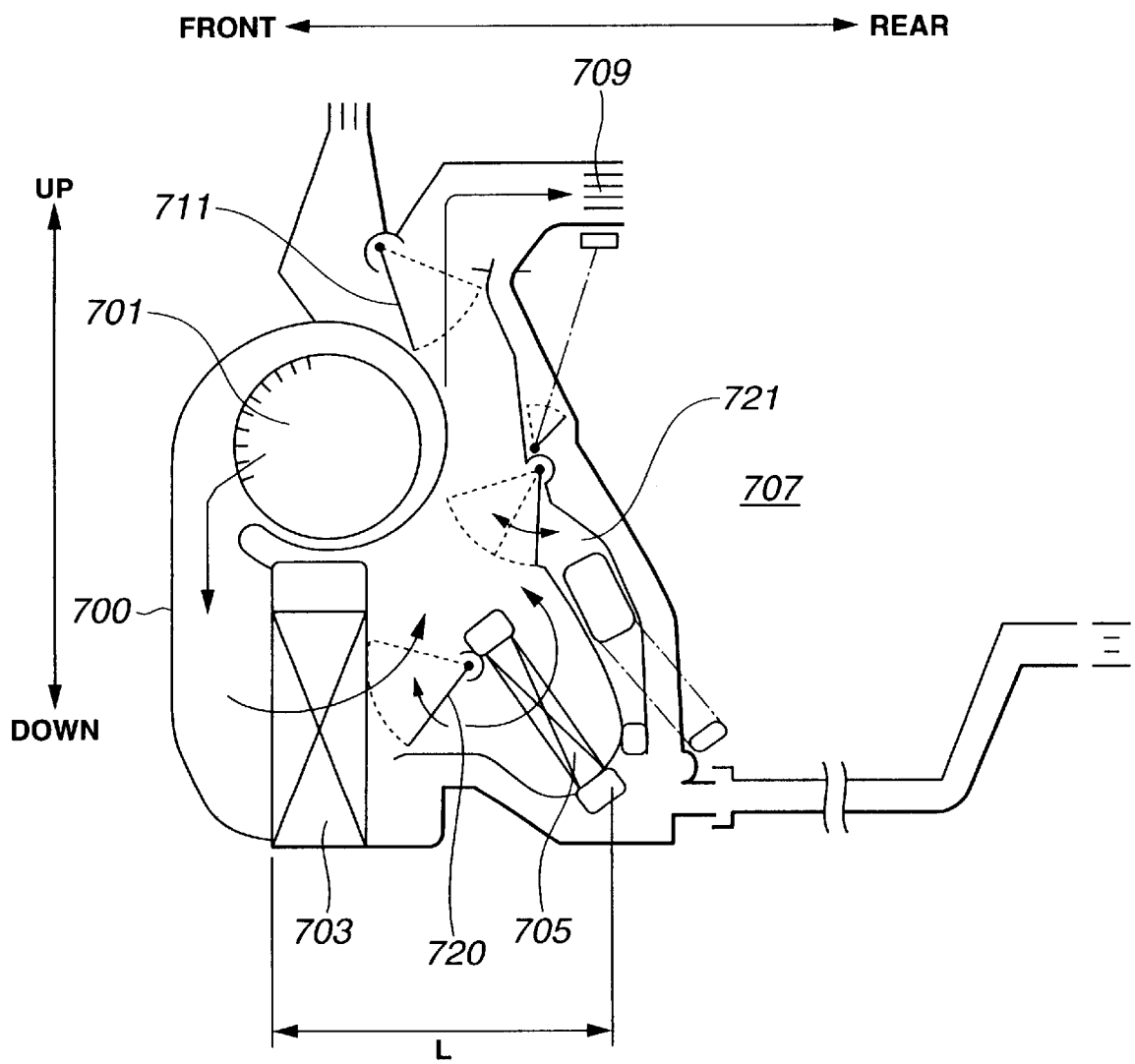
FIG. 29 is a schematic sectional view showing an air conditioning apparatus according to a first conventional example.

In the air conditioner unit of the related art shown in FIG. 29, a swingable air mix door 720 is disposed between cooling and heating heat exchangers 703 and 705. This arrangement requires a space for the air mix door 720 to swing between both heat exchangers 703 and 705. This space needs to be equal to or longer than the radius of the swing motion of the air mix door 720, and increases the longitudinal dimension L of the arrangement of the heat exchangers 703 and 705 along the front and rear longitudinal direction of the vehicle.

By contrast, the air mix door 45 according to this embodiment of the present invention is disposed on the downstream side of the heating heat exchanger 15. This arrangement makes it possible to decrease the spacing between the cooling and heating heat exchangers 13 and 15, and makes shorter the longitudinal dimension L of the beforementioned laid-low-T-shaped arrangement of the cooling and heating heat exchangers .13 and 15 along the front and rear longitudinal direction of the vehicle than the longitudinal dimension L shown in FIG. 29, to the advantage of size reduction of the air conditioner unit.

Moreover, the bypass passage 47 is formed between the heat exchangers 13 and 15, and the air mix door 45 is disposed in the vicinity of the bypass passage 47. This arrangement is advantageous for compactness and size reduction.

The leaning posture of the cooling heat exchanger 13 as distinguished from the exactly vertical posture of the cooling heat exchanger 703 of FIG. 29 is advantageous for reducing the height of the air conditioner unit and adequately adjusting the ratio of the front and rear dimension to the height of the unit. Preferably for balance between the longitudinal dimension and the height of the unit, the leaning angle θ1 of the cooling heat exchanger 13 is equal to or smaller than 30°, and the sloping angle θ2 of the heating heat exchanger 15 is equal to or smaller than 10°.

In the air conditioner unit of FIG. 29, a foot passage 721 is formed outside the unit case 700. In the air conditioner unit according to this embodiment of the present invention, by contrast, the foot passage 65 is compactly formed inside the case 1. Moreover, the first and second guide walls 102f and 102g not only define the foot passage 65 but also function to guide the air smoothly so as to reduce the resistance of the passages. The first guide wall 102f extends obliquely toward the confluence region where the air mix door 45 is disposed. Therefore, the air mix door 45 need not have a long width to close the entirety of the downstream outlet face of the heating heat exchanger 15. It is possible to reduce the width or the radius of the swing motion of the air mix door 45.

In a full cool mode where the warm air passage 49 is closed by the air mix door 45, part of the cool air from the cooling heat exchanger 13 tends to flow from a lower region below the heating heat exchanger 15, into the bypass passage 47. However, the heating heat exchanger 15 in the approximately horizontal posture makes it difficult for the air to flow alongside the heating heat exchanger 15 and thereby prevent the cool air from being warmed by the heating heat exchanger 15 in the full cool mode.

Figure 7:
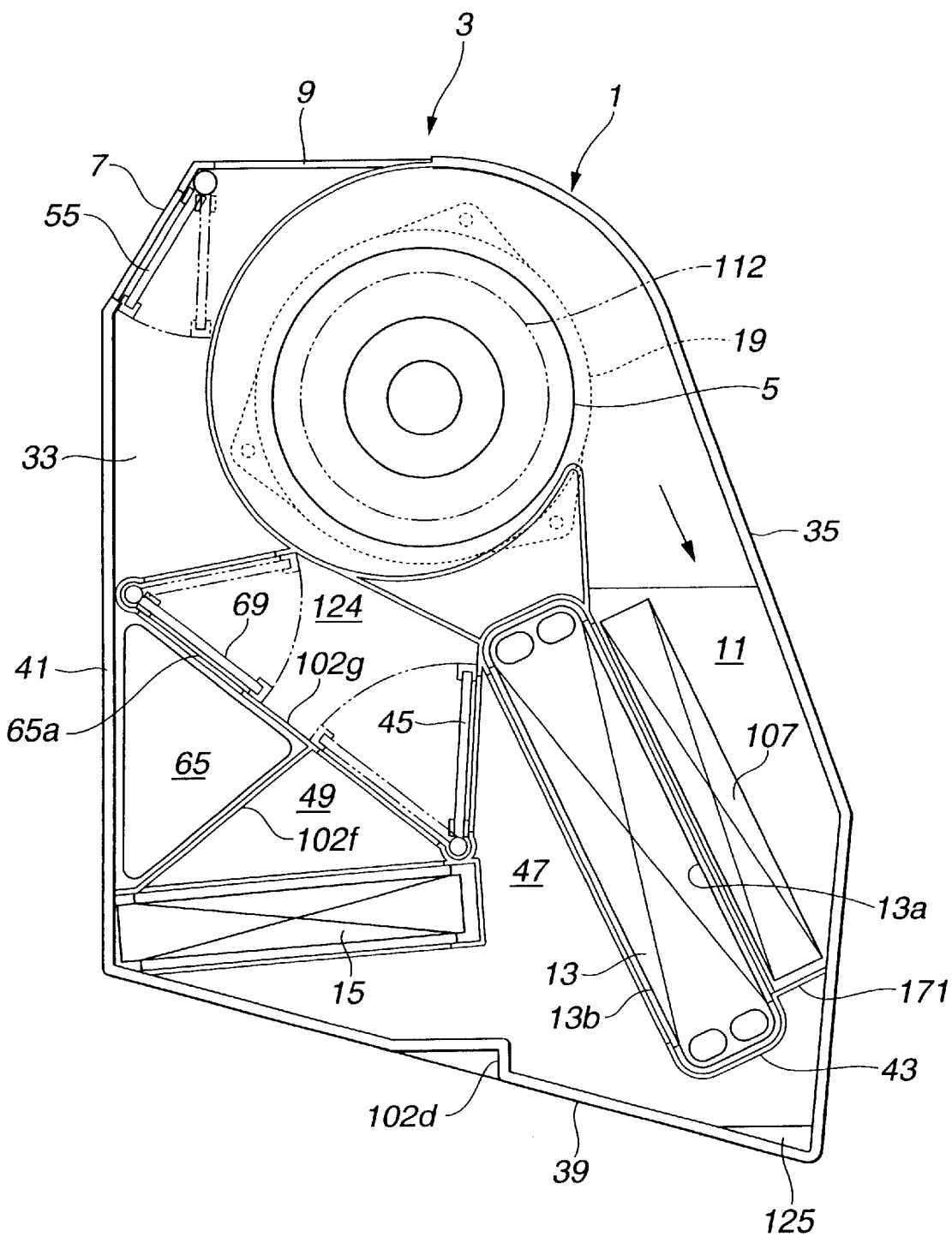
FIG. 7 is a sectional view showing an air conditioning unit in a third practical example according to the first embodiment of the present invention.
Figure 8:
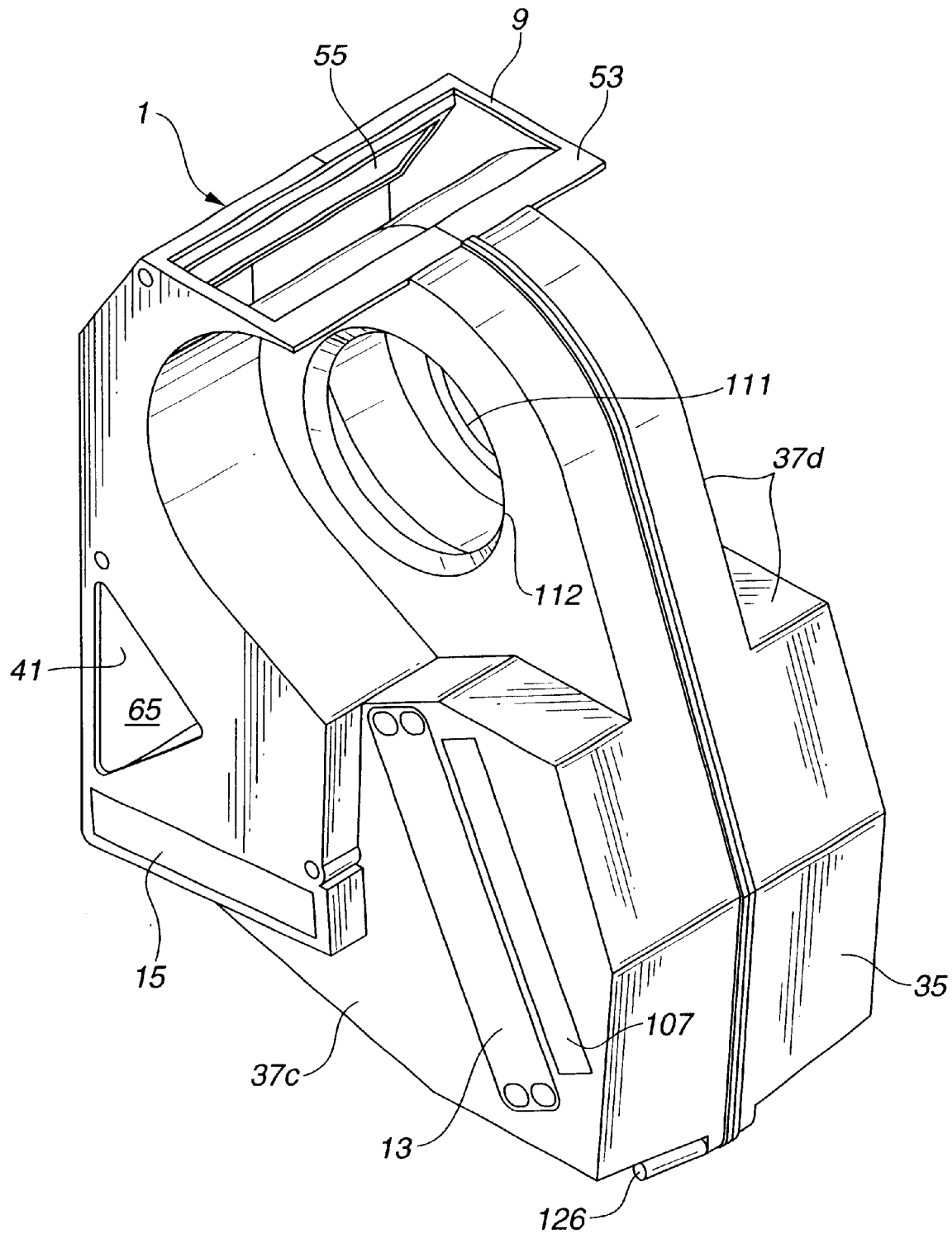
FIG. 8 is a perspective view showing the air conditioning unit of FIG. 7.
Figure 9:
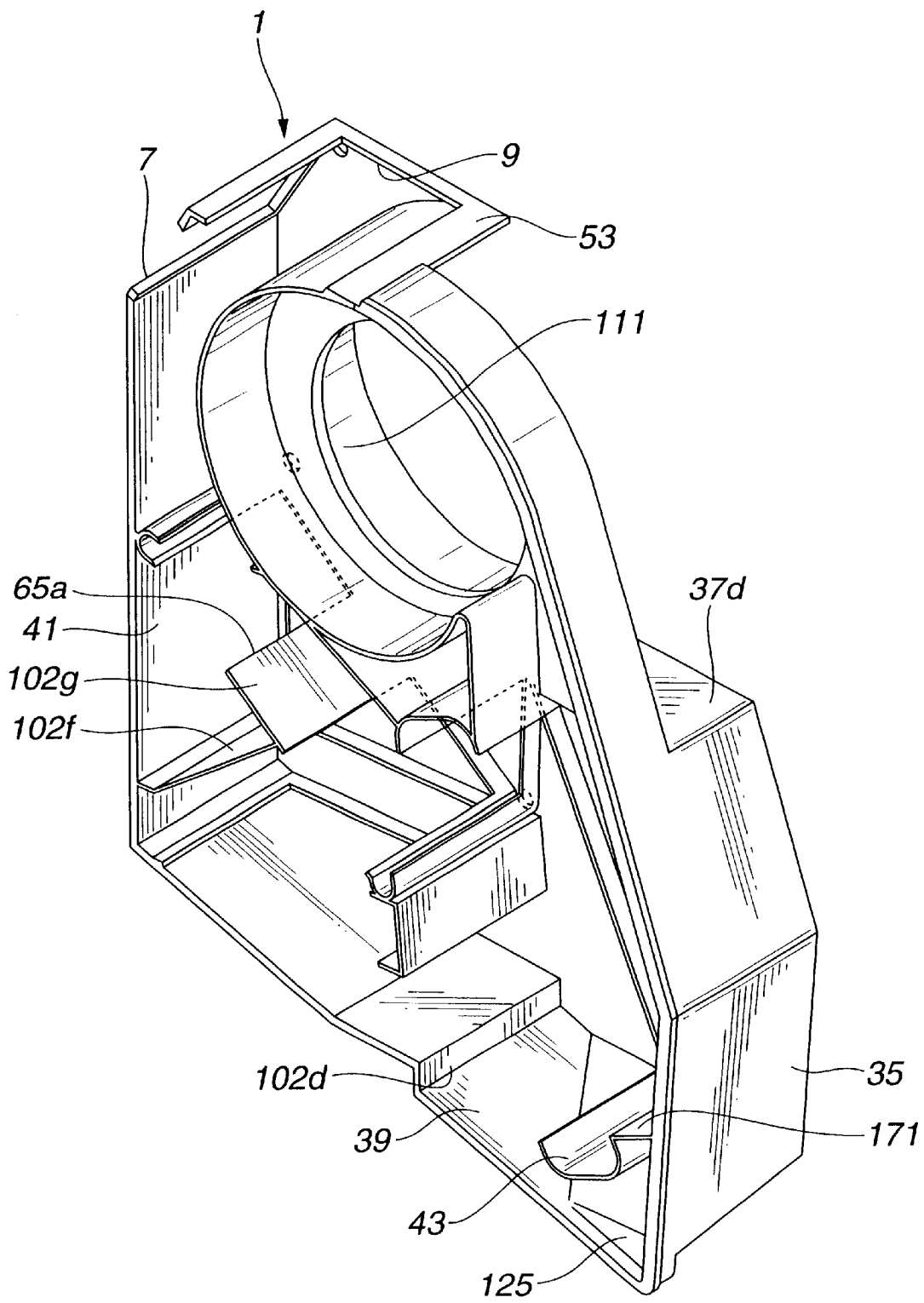
FIG. 9 is a sectional view showing the inner structure of a unit case of the air conditioning unit shown in FIG. 7.

FIGS. 7~9 are views of an air conditioning unit in a third practical example according to the first embodiment of the present invention. This air conditioning unit is substantially identical to that of FIG. 1.

As in the preceding examples, the air conditioner unit 1 has a drain reservoir 125 at the lower first side (rear) corner of the unit 1 As shown in FIG. 8, there is formed a drain pipe 126 for drainage of water from the drain reservoir 125. A partition wall 171 separates the downward passage 27 and the drain reservoir 125. This partition wall 171 further serves as a member for supporting the air filter 107, and as a reinforce for reinforcing the support member 43 supporting the lower end of the cooling heat exchanger 13 by connecting the support member 43 to the first side (rear) wall 35.

The drain reservoir 125 is located below the cooling heat exchanger 13 and on the first (rear) side of the downstream outlet face 13b of the cooling heat exchanger 13. This arrangement prevents the water in the drain reservoir 125 from being blown and splashed by the air stream passing through the cooling heat exchanger 13. The partition wall 171 prevents the water in the drain reservoir 125 from being blown and splashed by the downward air stream in the downward passage 27.

The thus-constructed air conditioner unit can effectively prevent splashes which would be carried into the passenger compartment or which would deteriorate the efficiency of the heating heat exchanger 15 by depriving the heating heat exchanger 15 of heat of vaporization.

Figure 30:
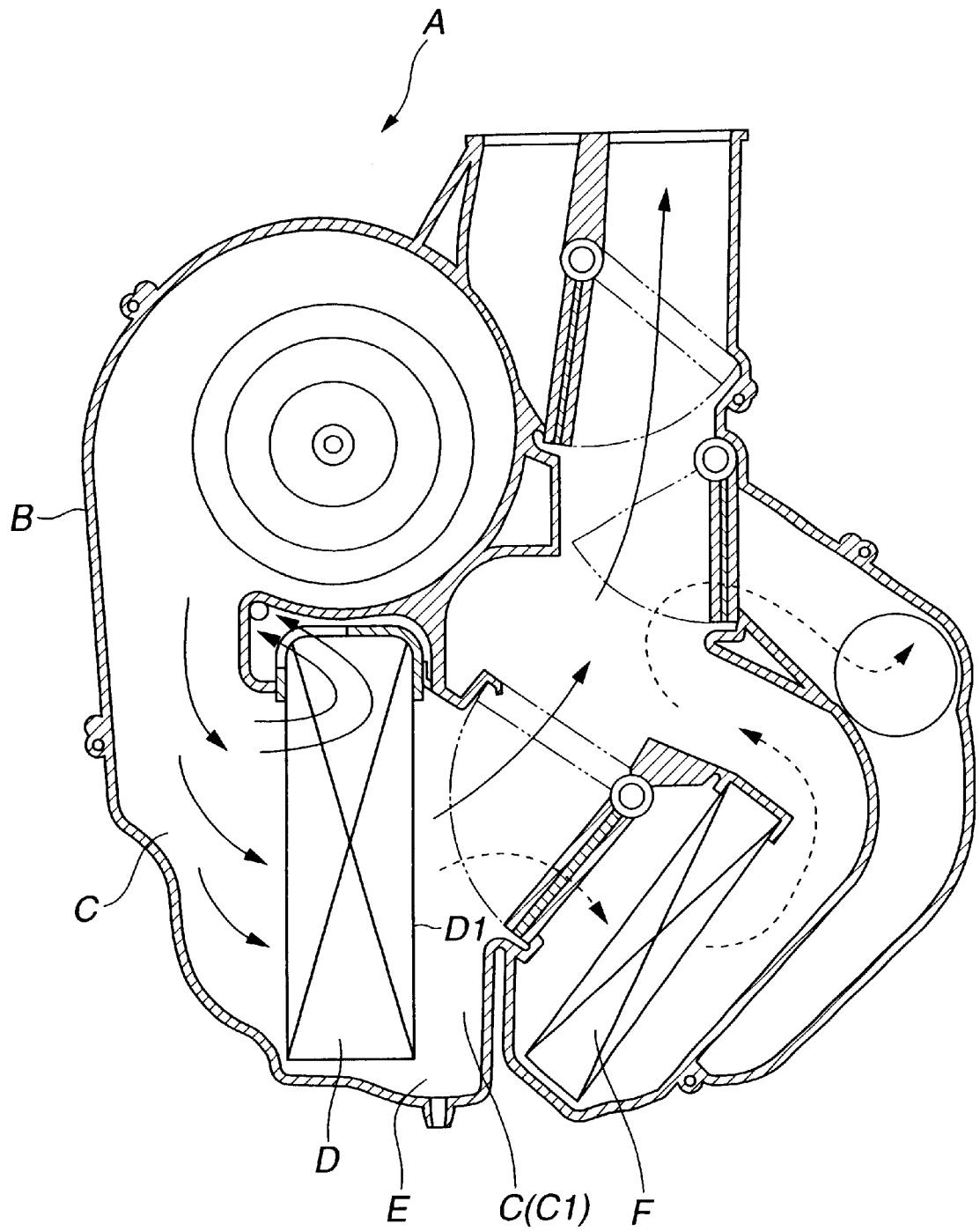
FIG. 30 is a sectional view showing an air conditioning apparatus according to a second conventional example.

For comparison, FIG. 30 shows an air conditioner unit A as disclosed in Japanese Patent Kokai Publication No. H11(1999)-235921. In this unit, a drain reservoir E is disposed on the downstream side of a cooling heat exchanger D. This arrangement is unable to prevent splashes properly.

Figure 10:
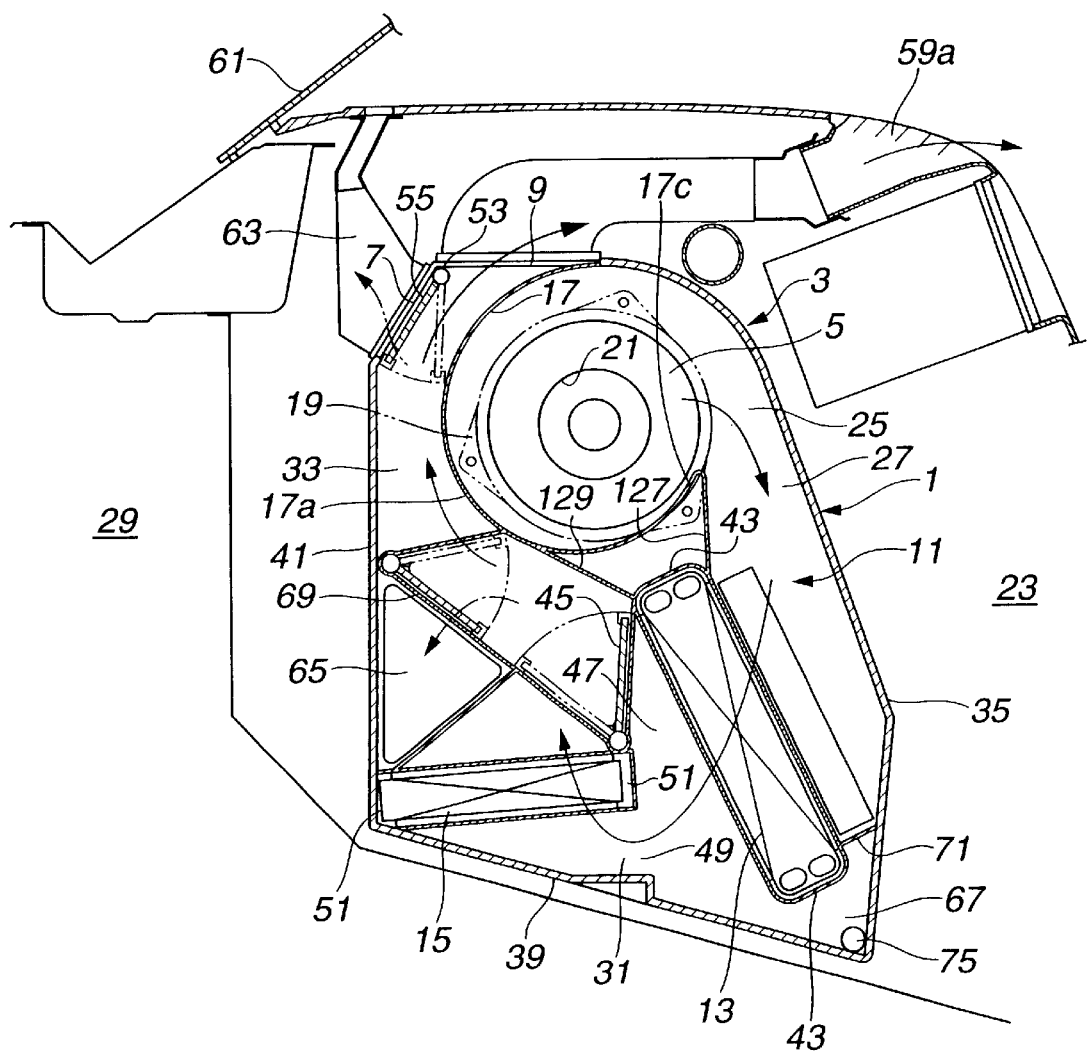
FIG. 10 is a schematic sectional view showing an air conditioning unit in a fourth practical example according to the first embodiment of the present invention.
Figure 11:
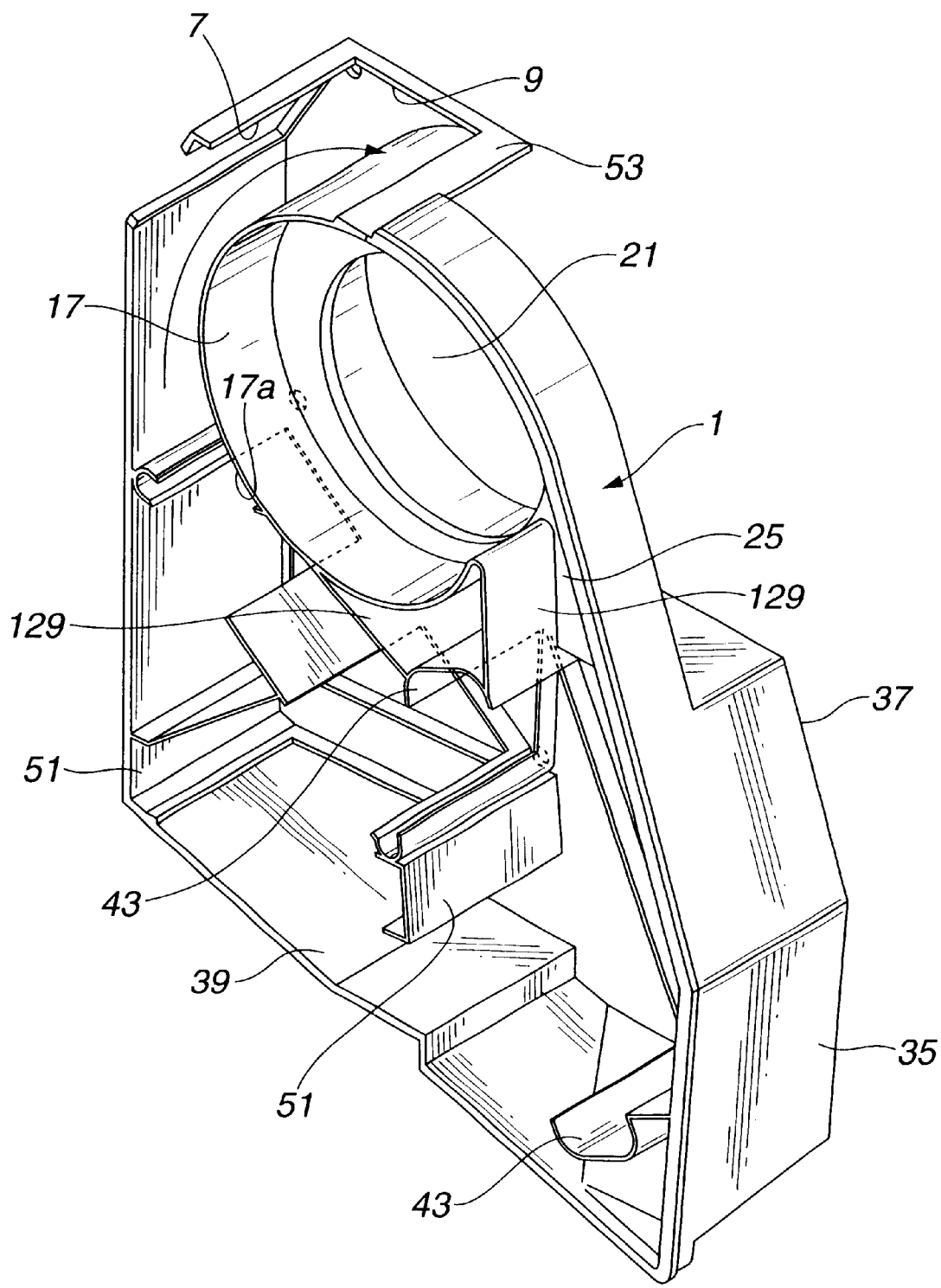
FIG. 11 is a perspective view showing the inner structure of the air conditioning unit of FIG. 10.

FIGS. 10 and 11 are views of an air conditioning unit in a fourth practical example according to the first embodiment of the present invention. This air conditioning unit is substantially identical to that of FIG. 1.

The unit case 1 is an assembly of left and right half members joined together by screw fastener. Each of the left and right half members is approximately a mirror image of the other.

The surrounding wall 17a of the blower housing 17 extends from the top of the case 1 around the blower fan 5 to a free end portion 17c confronting the first side (rear) wall 35 to define, therebetween, the outlet opening 25 for discharging the air into the downward passage 27.

The free end portion 17c of the surrounding wall 17a is supported by first and second (rear and front) support panels (or walls) 127 and 129 which extend upward, respectively, from the rear and front end of the upper support bracket 43 supporting the upper end of the cooling heat exchanger 13. The first. (rear) support panel 127 extends substantially along the vertical direction whereas the second (front) support panel 129 extends along an oblique direction intermediate between the upward direction and the front direction toward the second side (front) wall 41.

The second (front) support panel (or wall) 129 extends along a tangential direction to the cylindrical surface of the surrounding wall 17a, and thereby guides the air from the cooling heat exchanger 13 to the upward passage 33 defined between the outside cylindrical surface of the surrounding wall 17a of the blower housing 17 and the second side (front) wall 41. The outside flat surface of the second support panel 129 and the outside cylindrical surface of the surrounding wall 17a of the blower housing 17 form a smooth continuous wall surface for guiding the air smoothly to the upper outlet (7, 9).

The first support panel (or wall) 127 extends continuously and integrally from the end of the surrounding wall 17a to the upper end of the cooling heat exchanger 13, and guides the air from the blower fan 5 to the downward passage 27. The downward passage 27 is defined by the first side (rear) wall 35, the left and right side walls of the case 1 and the first support panel 127.

The support structure of the first and second support panels 127 and 129 can rigidly and firmly support the free end portion 17c of the blower housing 17, and guide the air smoothly.

FIGS. 12~15 are views of an air conditioning unit in a fifth practical example according to the first embodiment of the present invention. This air conditioning unit is substantially identical to that of FIG. 1.

The cooling heat exchanger 13 in the leaning posture extends obliquely along the downward passage 27.

An air filter 131 is disposed on the upstream side of the cooling heat exchanger 13 in the downward passage 27. The air filter 131 of this example is in the form of a rectangular plate shaped like a thin rectangular parallelepiped having a first face 131a facing toward the first side (rear) wall 35, a second face 131b facing toward the cooling heat exchanger 13, left and right sides, a lower side facing downward, and an upper side facing upward toward the upstream side of the downward passage 27.

Figure 12:
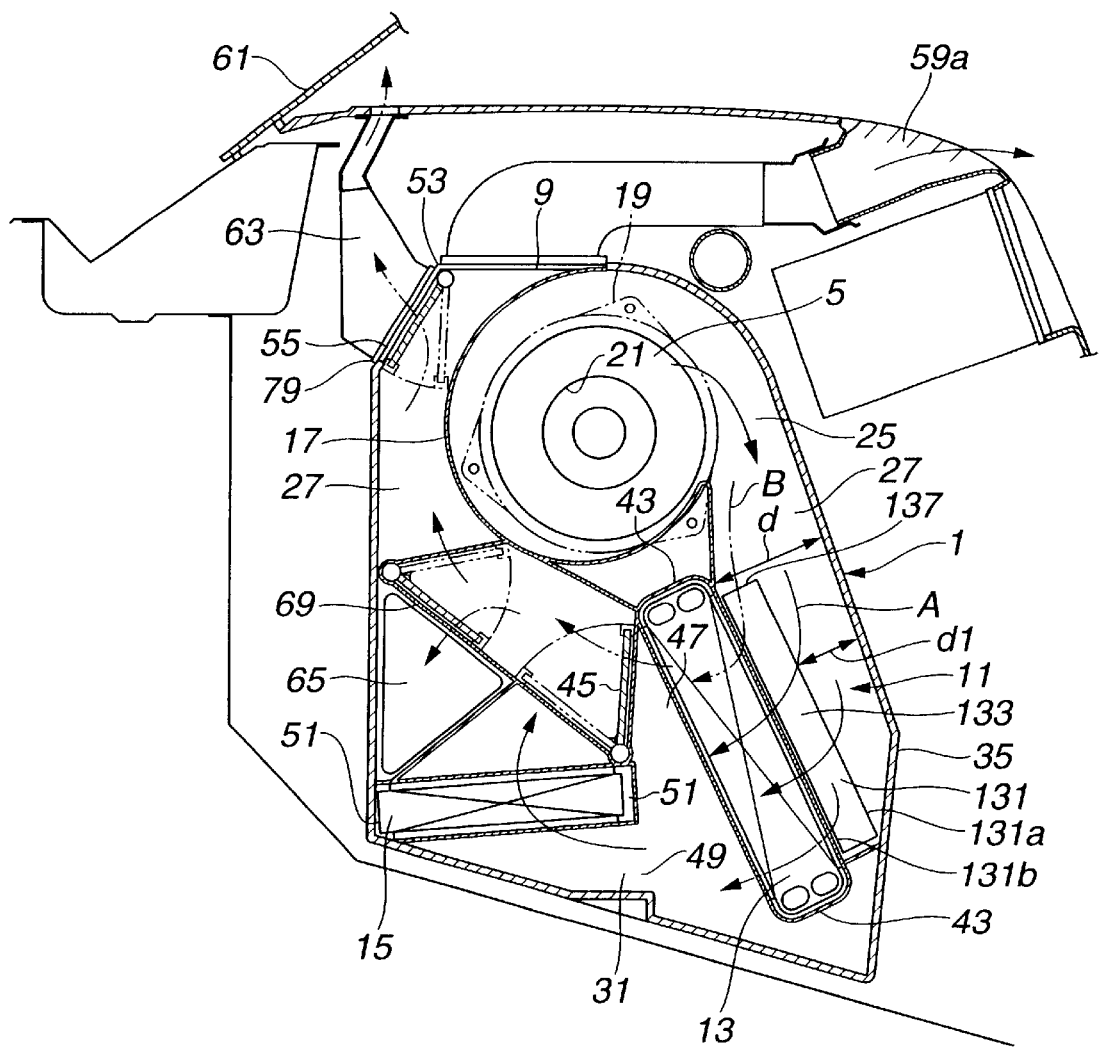
FIG. 12 is a sectional view showing an air conditioning unit in a fifth practical example according to the first embodiment.
Figure 13:
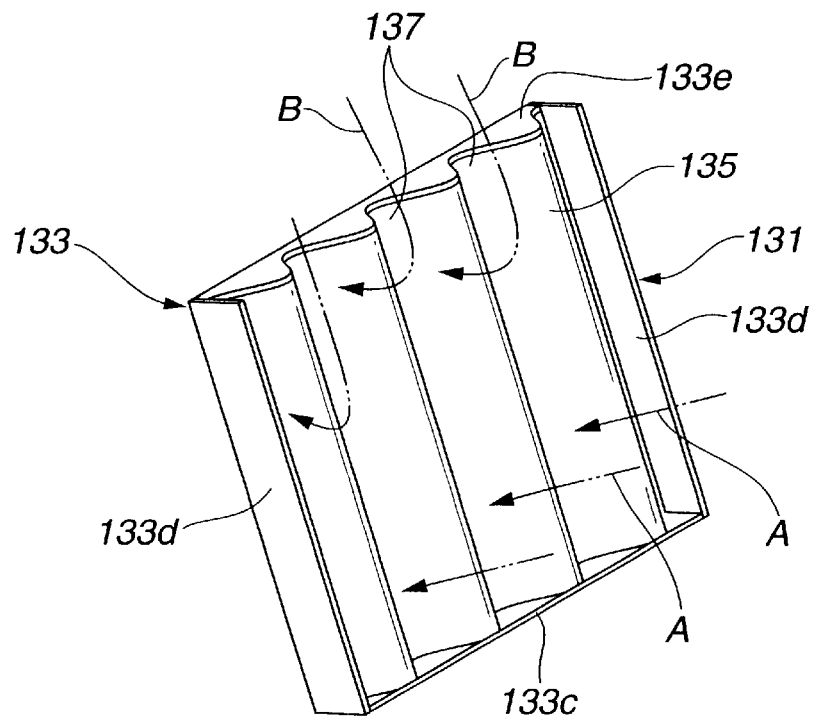
FIG. 13 is a schematic perspective view showing an air filter in the air conditioning unit of FIG. 12.

As shown in FIG. 13, the air filter 131 has a frame 133 and a filter plate 135 encased in the frame 133. The filter plate 135 shown in FIG. 13 is a rectangular corrugated sheet having parallel furrows and ridges. The frame 133 has a lower rim 133c defining the lower side of the rectangular parallel piped, left and right rims 133d and an upper rim 133e defining the upper side of the rectangular parallel piped. These rims are connected into the rectangular frame 133. The lower rim 133c and the left and right rims 133d are in the form of an upright wall perpendicular to the first and second faces 131a and 131b which are parallel to each other in this example. In the example of FIG. 13, the upright walls 133c and 133d are in the form of a long narrow rectangular plate having an equal width, so that the upright walls 133c and 133d are uniform in height. The upper rim 133e is in the form of a shaped wall having a plurality of notches 137 for allowing the air discharged from the upstream side of the downward passage 27 to flow into the furrows of the filter plate 135 on the upstream side. Each furrow on the upstream side extends vertically from the upper rim 133e to the lower rim 133c. The lower end of each furrow formed on the upstream side of the filter plate 135 is closed by the lower rim 133c in the form of the upright wall. Each of the notches 137 in the upper rim 133e defines an open upper end of a unique one of the furrows formed on the upstream side of the filter plate 135. Therefore, each furrow opens upward toward the outlet opening 25 of the blower housing 17. This air filter 131 admits frontal air streams as shown by arrows A in FIGS. 12 and 13, and direct air streams through the open upper ends 137 of the furrows as shown by arrows B in FIGS. 12 and 13.

Figure 14:
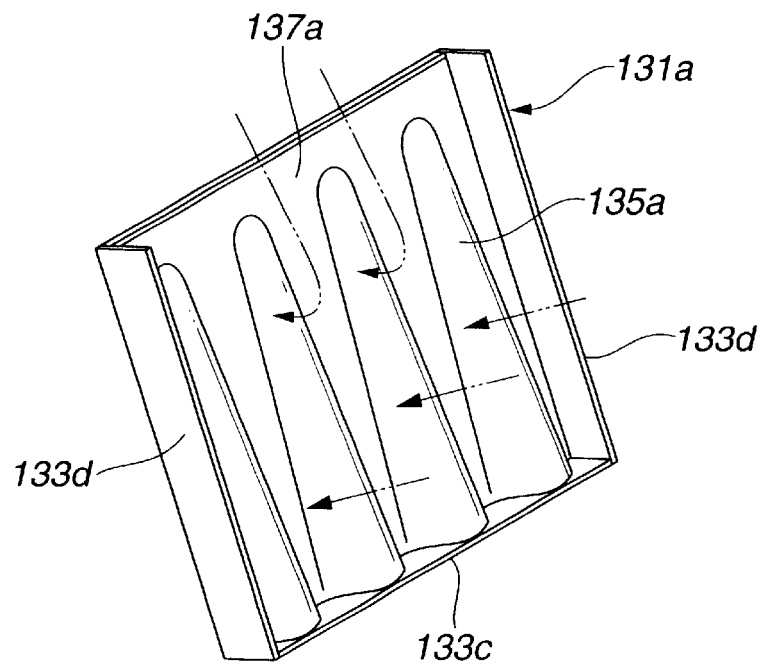
FIG. 14 is a schematic perspective view of an air filter which can be used in place of the air filter of FIG. 13.

FIG. 14 shows an air filter 131a of another example. In this example, each ridge (or each furrow) of a filter plate 135a decreases gradually in sectional size from the lower end toward the upper end, and dwindles away to nothing in an upper end region in which the filter plate 135 is substantially flat. The filter frame 133 has a long open upper end 137a formed by the upstream side surface of the flat upper end region of the filter plate 135 and the upper ends of the left and right upright walls 133d. The long open upper end 137 extends continuously from the left rim 133d to the right rim 133d. The upper rim 133e is eliminated, or made so low that the upper rim 133e does not project beyond the flat upper end region of the filter plate 135.

Figure 15:
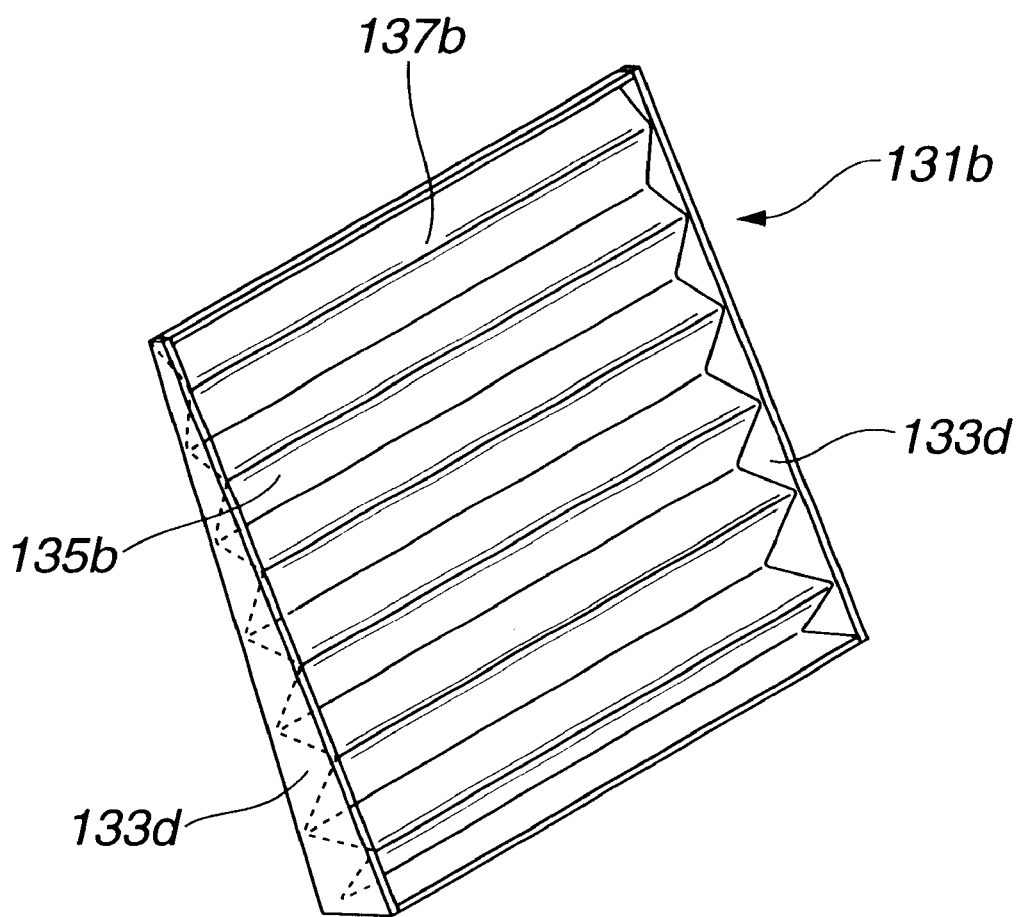
FIG. 15 is a schematic perspective view of an air filter which can be used in place of the air filters of FIGS. 13 and 14.

FIG. 15 shows an air filter 131b of still another example. In this example, the filter plate 135b has ridges and furrows extending transversely from the left rim 133d to the right rim 133d. Each ridge (or each furrow) is uniform in sectional size from the left end to the right end. However, the sectional sizes of the ridges (or furrows) are decreased from ridge to ridge along the upward direction from the lower rim 133c toward the upper end of the filter plate 135b. Each of the left and right upright walls 133d is decreased gradually in height along the upward direction from the lower rim 133c toward the upper end of the air filter 131b. The upper rim 133e if any does not project beyond the filter plate 135b toward the first side (rear) wall 35. The air can flow smoothly from an upper wide open region 137b of the frame 133 onto the upstream side of the filter plate 135b.

By the air filter, the width d of the downward air passage 27 is decreased (to dl as shown in FIG. 12). However, the air filters shown in FIGS. 13~15 can ensure a sufficient amount of downward stream through the upper open region 137, 137a and 137b from the upper side.

It is optional to place the air filter in an air passage section leading the air from the blower from the engine room's side to the passenger compartment's side.

FIGS. 16~26 are views for illustrating a second embodiment of the present invention.

Figure 16:
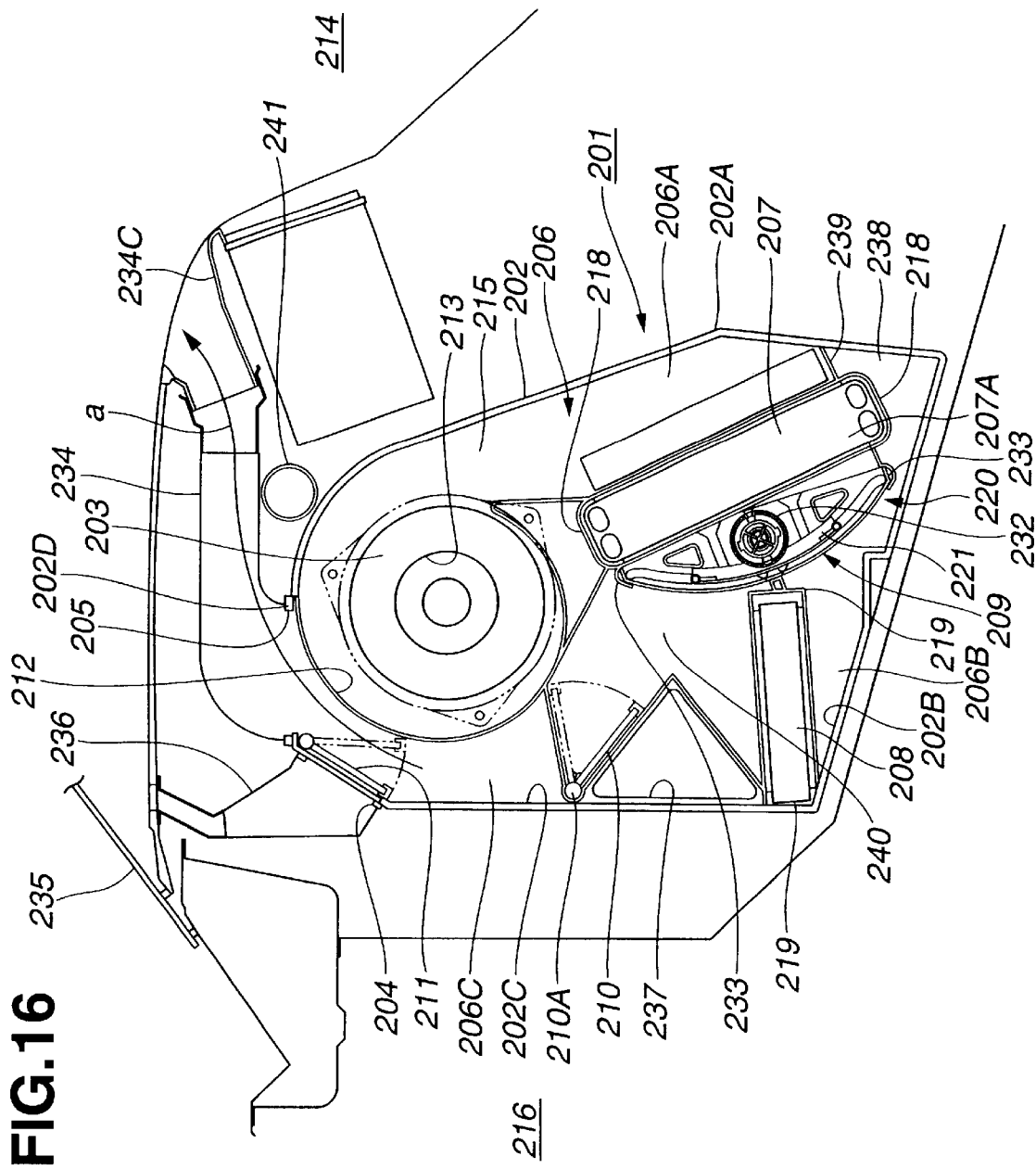
FIG. 16 is a longitudinal sectional view showing an air conditioning apparatus according to a second embodiment of the present invention.

As in the first embodiment, a unit case 202 shown in FIG. 16 encases a blower fan 203, a cooling heat exchanger (evaporator) 207 and a heating heat exchanger (heater core) 208. An air conditioning passage 206 formed in the case 1 conveys air from the blower fan 203 to an upper outlet (204 and 205) opened in the case 1. An air conditioner unit 201 shown in FIG. 16 further includes an air mix door unit 209, an intermediate foot door 210 and an upper door 211.

The blower fan 203 is installed in a blower housing or scroll housing 212 having a surrounding wall surrounding the blower fan 5. The surrounding wall of this example has a curved surface such as a cylindrical surface extending circumferentially around the blower fan 203.

The blower housing 212 has an air inlet opening 213 and an air outlet opening 215 opening into the air conditioning passage 206.

The air conditioning passage 206 includes a downward passage 206A, a U-turn lower passage 206B and an upward passage 206C which are all sections of the air conditioning passage 206, connected in series to form a single continuous path.

Figure 17:
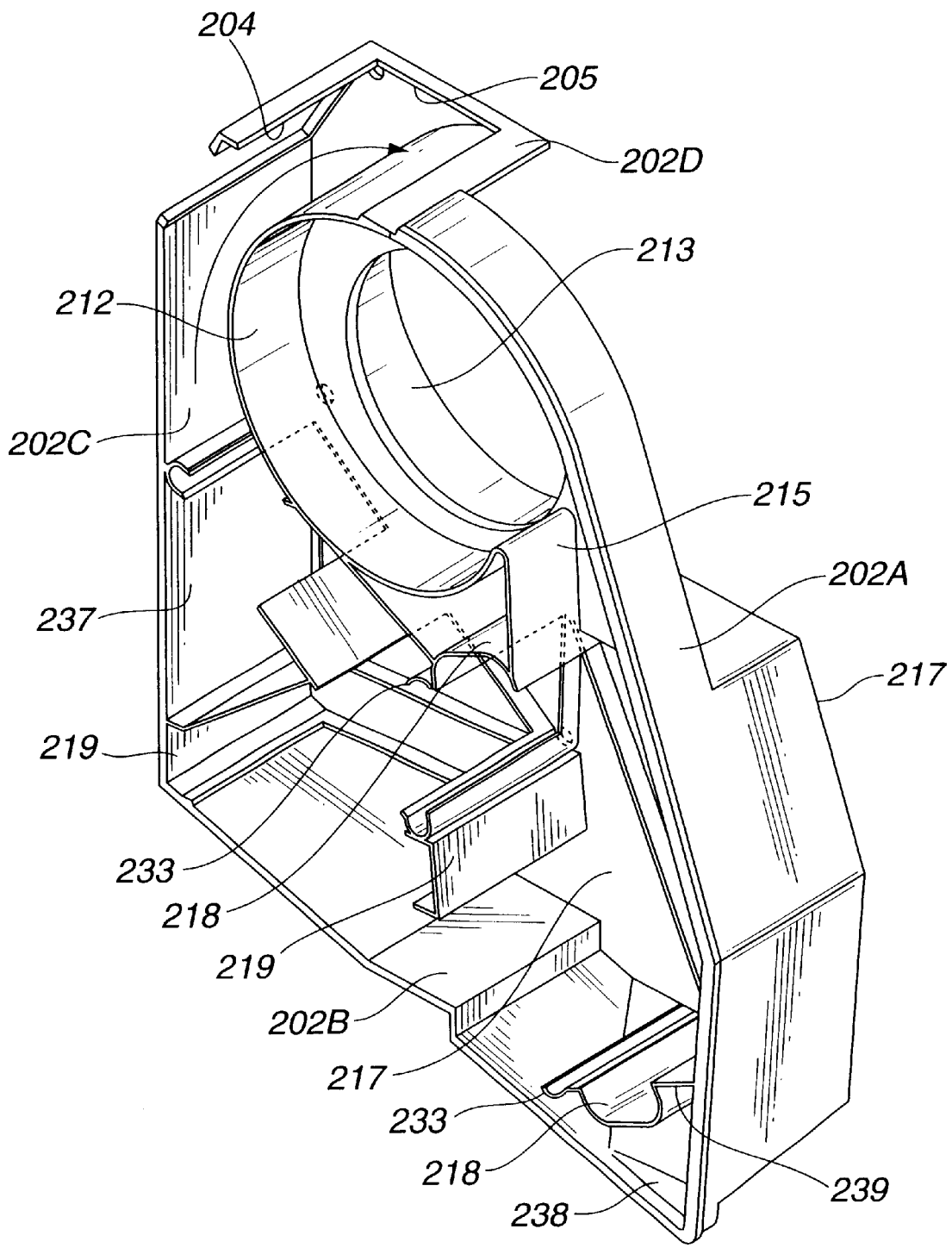
FIG. 17 is a perspective view showing a half of a unit case of an air conditioning unit in the apparatus of FIG. 16.

The case 1 has a first side wall (or rear wall) 202A, a second side wall (or front wall) 202C, a lower (or bottom) wall 202B, and left and right (or third and fourth) side walls 217. The first side (rear) wall 202A has an outside surface facing the passenger compartment 214, and an inside surface defining the downward passage 202A with the left and right walls 217, as shown in FIG. 17. The lower (bottom) wall 202B defines the lower U-turn passage 206B with the left and right side walls 37. The second side (front) wall 202C has an outside surface facing toward the engine room 216, and an inside surface defining the upward passage 206C with the left and right walls 217 and the outside surface of the surrounding wall of the blower housing 212.

The cooling heat exchanger 207 is supported in the case 1 by upper and lower support brackets 218. In this example, too, the cooling heat exchanger 207 leans slightly toward the heating heat exchanger 15. The leaning angle ($\theta$1) is in the range from 0° to about 30°. Preferably, the leaning angle is equal to about 20°.

The heating heat exchanger 208 is installed in a lying or (approximately) horizontal posture between the cooling heat exchanger 207 and the second side wall 202C. The heating heat exchanger 208 is supported in the case 1 by front and rear support brackets 219. The heating heat exchanger 15 extends from a front end (or far end) to a rear end (or near end), toward an intermediate position of the cooling heat exchanger 207, as in the preceding embodiment. Thus, the heat exchangers 207 and 208 are placed in the laid-low-T-shaped arrangement.

The heating heat exchanger 208 is located below an imaginary straight line connecting the lower end of the air outlet area of the cooling heat exchanger 207, with the axis 210A of the swing type intermediate door 210. The heating heat exchanger 208 is located below an imaginary straight line passing through the swing axis 210A of the door 210 and through the upper end of a slide plate 221 of the air mix door unit 209 when the air mix door unit 209 is in a full cool mode as mentioned later.

The air mix door unit 209 of this embodiment is a slide door unit for directing air from the cooling heat exchanger 207 to the upstream side and/or the downstream side of the heating heat exchanger 208 for mixing warm air and cool air in a mixing region (or mixing chamber) 240 downstream of the heating heat exchanger 208. The slide door unit 209 is superposed on the downstream outlet face of the cooling heat exchanger 207. The slide door unit 209 extends from an upper end to a lower end alongside the cooling heat exchanger 207.

The slide door unit 209 includes a door frame 220 defining an air passage or doorway, a slide door plate 221 slidable up and down in the frame 220, and a drive mechanism (322, 332) for moving the slide pate 221 up and down. The drive mechanism includes a drive shaft 222. The door frame 220 of this example is a rectangular frame having a rectangular opening defining a cross section of the lower passage 206B.

The slide door frame 220 has left and right side plate segments (or jambs) 223 and first and second parallel transverse bars 224 which are connected to form a rectangular frame. The left and right side segments 223 confront each other across the rectangular opening. Each segment 223 extends from an upper end to a lower end alongside the cooling heat exchanger 207. The first transverse bar 224 extends, along the left and right transverse direction of the case 202 or a widthwise direction w of the slide door unit 209, from the first (upper) end of the left side segment 223 to the first (upper) end of the right side segment 223. The second transverse bar 224 extends between the second (lower) ends of the left and right side segments 223.

Each of the left and right side plate segments 223 is shaped like a segment of a circle, and has a chordal edge extending rectilinearly like a chord, and an arc edge extending curvedly like an arc subtended by the chord.

Each of the left and right segments 223 has a center bearing hole 223A and a guide groove 223B. The center bearing hole 223A is formed at the center of each segment 223. The guide groove 223B of each (left or right) segment 223 extends curvedly like an arc along the arc edge of the segment 223, and has first and second groove sections separated at the middle just below the center hole 223A. Each segment 223 further has first and second straight grooves (or slide pin receiving grooves) 223C extending, on both sides of the center bearing hole 223A, from the chordal edge, respectively, to the first and second groove sections of the guide groove 223B. The guide groove 223B and the straight grooves 223C are all formed in the inside surface of one of the segments 223 confronting the inside surface of the other segment 223. In each segment 223, the first and second straight grooves 223C are parallel to each other and perpendicular to the chordal edge. The inner ends of the first and second straight grooves 223C are connected, respectively, with the first and second groove sections of the guide groove 223B.

The distance between the left and right frame side segments 223 is substantially equal to the width of the air passage in the cooling heat exchanger 207. The air passage size of the rectangular opening defined by the rectangular frame 220 is substantially equal to the size of the flow passage in the cooling heat exchanger 207. A lateral arc guide plate rib 225 projects like a rim from the arc edge of each (left or right) side segment 223 inward toward the opposite side segment 223. Each left or right lateral arc guide rib 225 has a predetermined width and extends curvedly along the arc edge of the corresponding segment 223.

Figure 18:
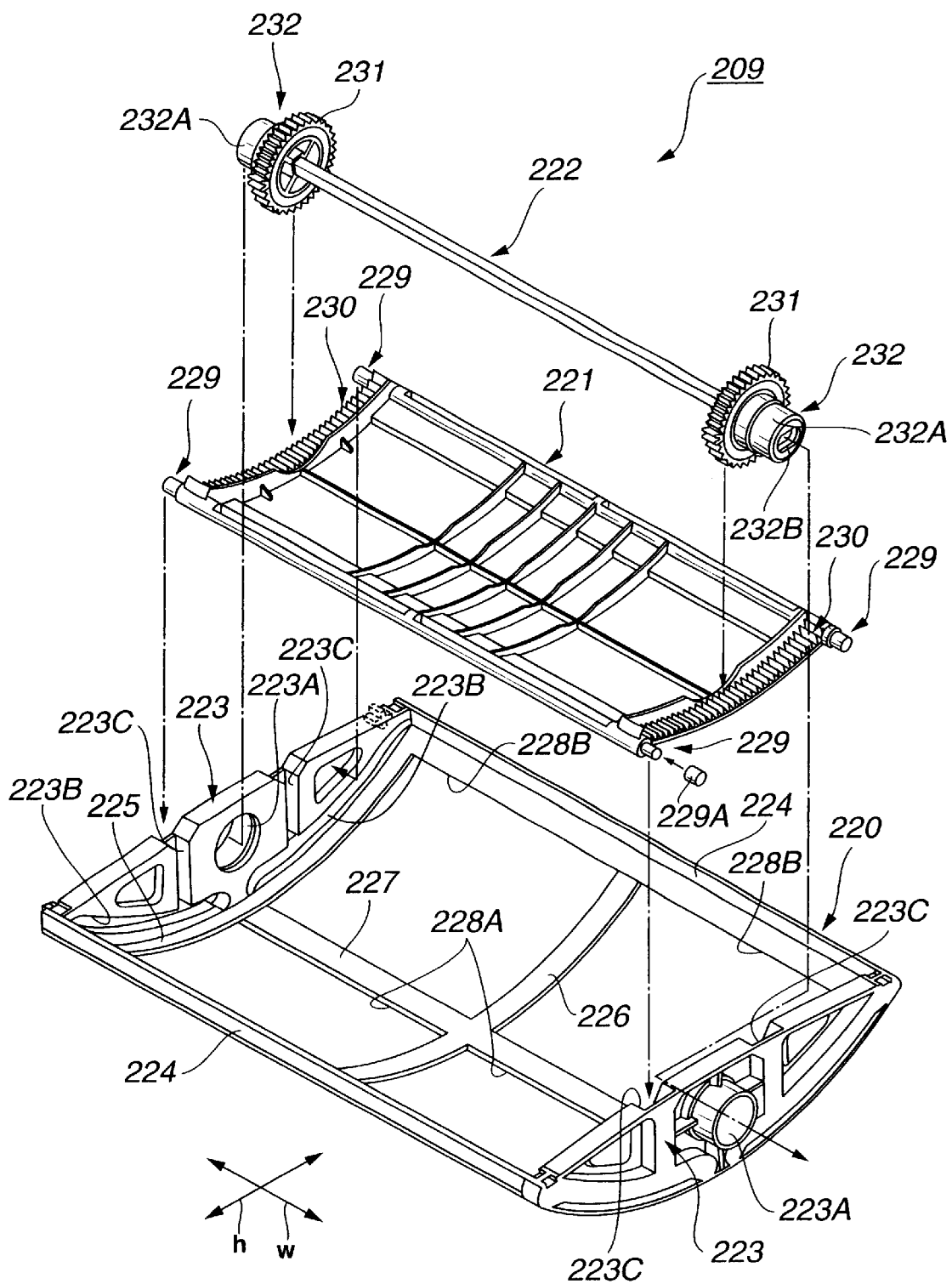
FIG. 18 is an exploded perspective view showing a slide door unit in the air conditioning unit shown in FIG. 16.

The slide door frame 220 further includes a center arc guide plate 226 extending curvedly from the middle of the first transverse bar 224 to the middle of the second transverse bar 224. A reinforcing transverse bar (or strip) 227 connects the middles of the arc edges of the left and right frame side segments 223. The parallel first and second transverse bars 224 and the left and right lateral arc guide plate ribs 225 define a curved rectangular open surface which is divided into two upper rectangular open regions 228A and two lower rectangular open regions 228B by the center arc guide plate 226 and the reinforcing transverse bar 227, as shown in FIG. 18.

The slide door plate 221 is in the form of a rectangular plate curved in conformity with the curved open surface of the door frame 220. The slide door plate 221 is disposed on the inner (or upstream) side of the frame 220. The slide plate 221 has left and right lateral arc edges each extending curvedly from an upper end to a lower end. Each of the lateral arc edges of the slide plate 221 has first and second (or upper and lower) slide pins 229 projecting integrally from the slide door plate 221 along the transverse (or widthwise) direction w. Therefore, the slide door plate 221 has the four slide pins 229 at the four corners. Each slide pin 229 is covered with a slide cylindrical cap 229A of material having antifriction qualities for facilitating the slide motion of the slide plate 221.

Each of the left and right lateral arc edges of the slide door plate 221 is in the form of a curved strip bar having an outside curved surface and an inside curved surface, in which rack teeth 230 are formed. The dimension of the slide door plate 221 measured along the transverse or widthwise direction w is substantially equal to the distance between the left and right segments 223 of the door frame 220. The dimension of the slide door plate 221 measured along the up and down direction h shown by arrows in FIG. 18 is smaller than the dimension of the curved open surface defined by the frame 220 along the up and down direction h, and slightly longer than half of the length of the guide plate ribs 225 of the frame 220. When installed in the frame 220, the slide plate 221 can fully close and fully open each of the upper opening consisting of the two (left and right) rectangular openings 228A, and the lower opening consisting of the two (left and right) rectangular openings 228B.

Figure 19:
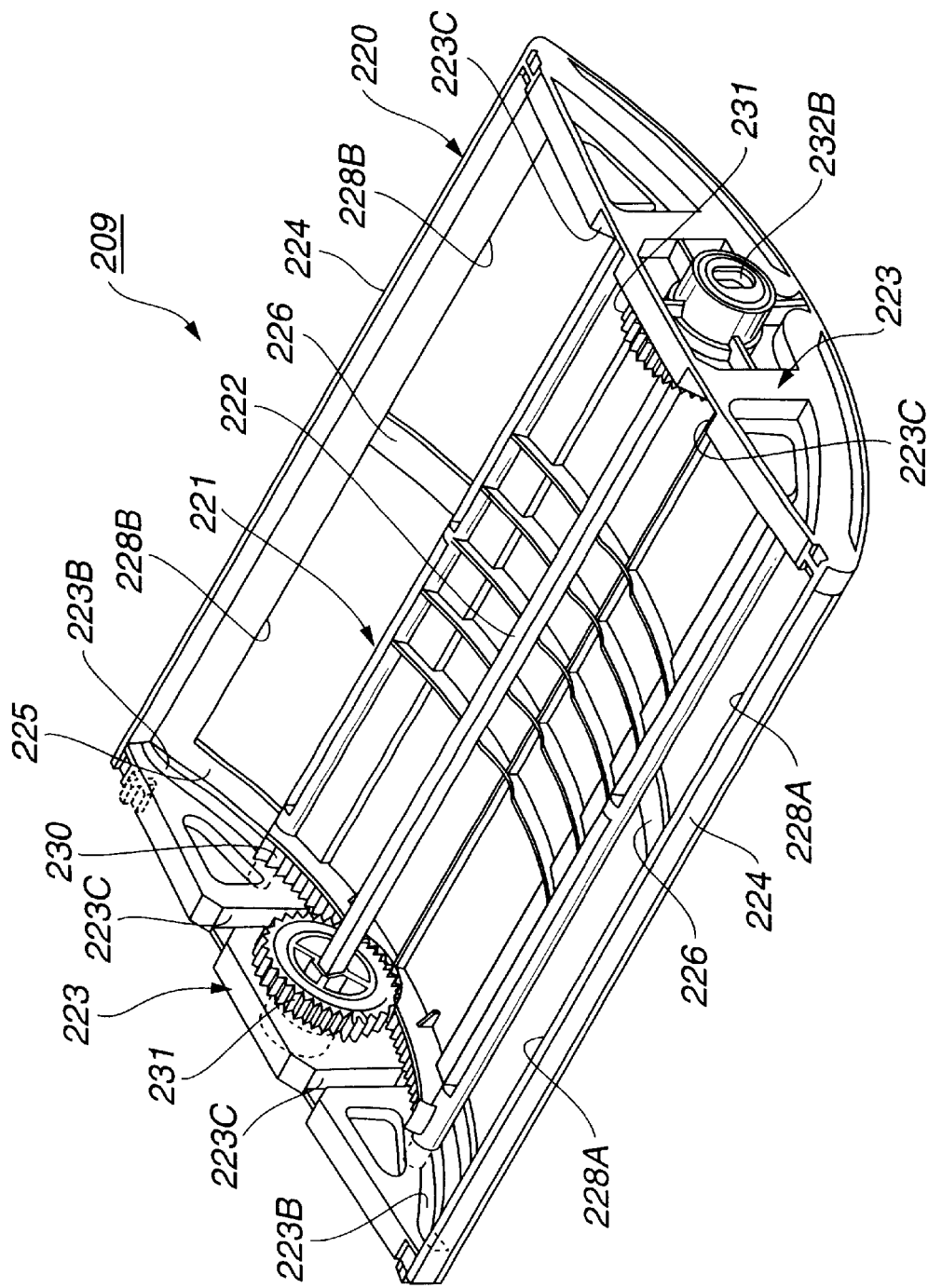
FIG. 19 is a perspective view of the slide door unit of FIG. 18,.

The drive shaft 222 extends in the transverse direction w and has left and right ends each equipped with a rotating end member 232 having a pinion gear 231 and a cylindrical shaft end 232A projecting outwardly coaxially with the pinion gear 231. The shaft end 232A is smaller in diameter than the pinion gear 231. The left and right shaft ends 232A of the drive shaft 222 are rotatably received in the left and right center bearing holes 223A of the door frame 220, respectively. The drive shaft 222 is adapted to be driven by receiving rotation from a drive apparatus (not shown). In this example, the drive shaft 222 has a drive connection slot or groove 232B formed at one shaft end for receiving torque from the drive apparatus. FIG. 19 shows the slide door unit 209 including the frame 220, the slide plate 221 and the drive shaft 222 in the assembled state. Rotation is transmitted from the drive apparatus to the drive shaft 222, which in turn. drives the slide plate 221 up and down through the left and right rack and pinion gear sets 230 and 231.

The thus-constructed slide door unit 209 is supported by upper and lower door support brackets 233 in the air conditioner unit 201, as shown in FIG. 16. As shown in FIG. 17, the (upper or lower) door support bracket 233 in each of the upper and lower sides is an integral part of a (upper or lower) support bracket 218 for supporting the cooling heat exchanger 207. The slide door unit 209 is so placed that the flat face of the slide door unit 209 faces and covers entirely the cooling heat exchanger 207, the curved face of the slide door unit 209 bulges downstream toward the heating heat exchanger 208, and the upper openings 228A are located above the lower openings 228B. The air conditioner system of the vehicle is arranged to control the door position of the slide door unit 209 by controlling the drive apparatus connected through the connection slot 232B of the drive shaft 222.

Figure 20:
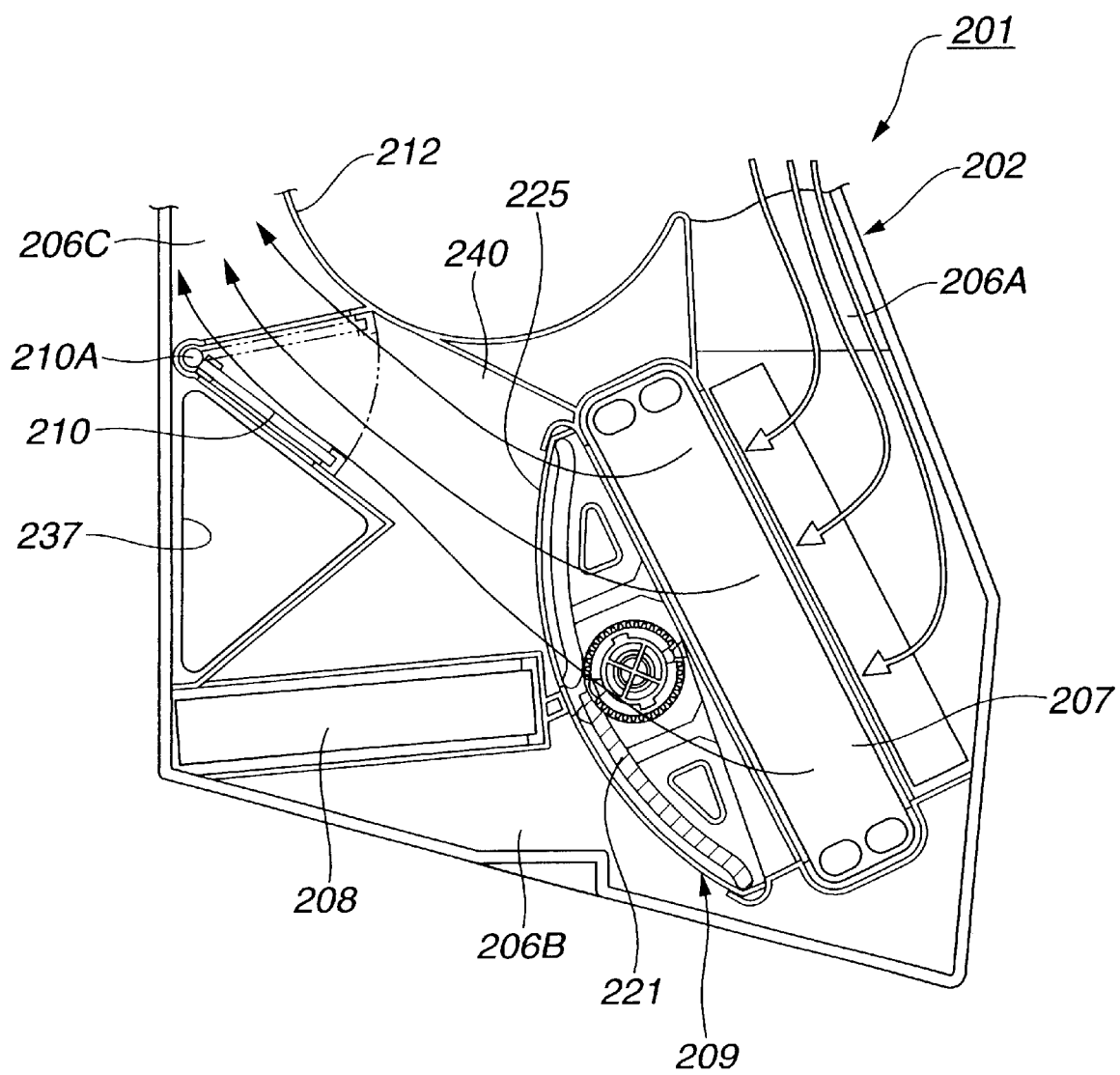
FIG. 20 is a sectional view showing the air conditioner unit of FIG. 16 in a full cool mode.

When the air conditioner unit 201 is in the full cool mode as shown in FIG. 20, the slide plate 221 of the slide door unit 209 is in a lowermost position for fully closing the left and right lower openings 228B of the door frame 220. In the state of the FIG. 20, the intermediate foot door 210 is in the closed position closing the intermediate opening to the intermediate air passage 237. Air streams flow downward from the blower fan 203 through the downward passage 206A into the cooling heat exchanger 207 as shown by white arrows in FIG. 20. The air cooled in the cooling heat exchanger 207 flows upward as shown by black arrows from the cooling heat exchanger 207 through the upper openings 228A of the slide door frame 220, and the air mix chamber 240 into the upward passage 206C. Since the heating heat exchanger 208 is laid low under an imaginary straight line connecting the axis of the intermediate door 210 and the lower end of the air passage in the cooling heat exchanger 207, the cooled air can pass through the upper openings 228A and smoothly flow into the upward passage 206C without being obstructed by the heating heat exchanger 208. This arrangement can reduce noises by reducing the resistance of the air passage, and prevent turbulence which would involve the cooled air into the heating heat exchanger 208.

When the intermediate door 210 is half opened in the state of the slide door plate 221 being in the lowermost position, the air conditioner unit 201 can supply the cooled air to the upper openings 204 and 205 through the upward passage 206C and simultaneously to the intermediate foot outlet passage 237.

Figure 21:
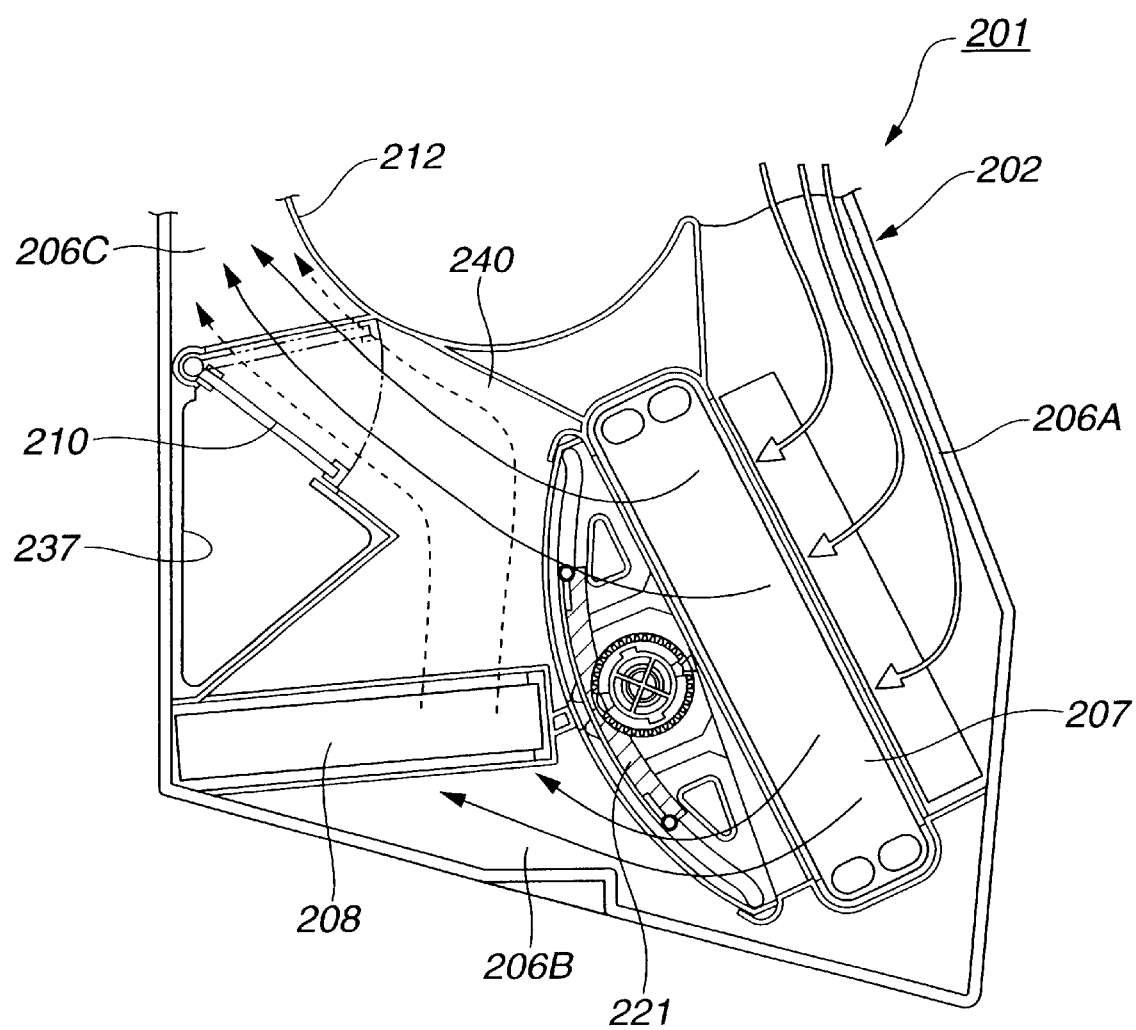
FIG. 21 is a sectional view showing the air conditioner unit of FIG. 16 in a ventilation mode or a defrosting mode.

When, as shown in FIG. 21, the slide plate 221 is in an intermediate position and the intermediate foot door 210 is in the closed position closing the intermediate opening, the cool air from the cooling heat exchanger 207 passes through both the upper side and lower side of the slide door plate 221 in the intermediate position. Upper air streams through the upper openings 228A can flow directly into the mix chamber 240. Lower air streams An through the lower openings 228B enter the heating heat exchanger.208 and become warm air streams. The warm air streams, as shown by broken line arrows in FIG. 21, flow upward from the heating heat exchanger 208 into the air mix chamber 240 where the warm air and cool air are mixed. The slide door unit 209 makes it possible to increase the volume of the air mix chamber 240, and thereby to improve the mixing and flow resistance in the air mix chamber. If, in this state, the intermediate foot door 210 is opened, the conditioned air of a controlled temperature in the air mix chamber 240 flows into the intermediate foot outlet passage 237.

Figure 22:
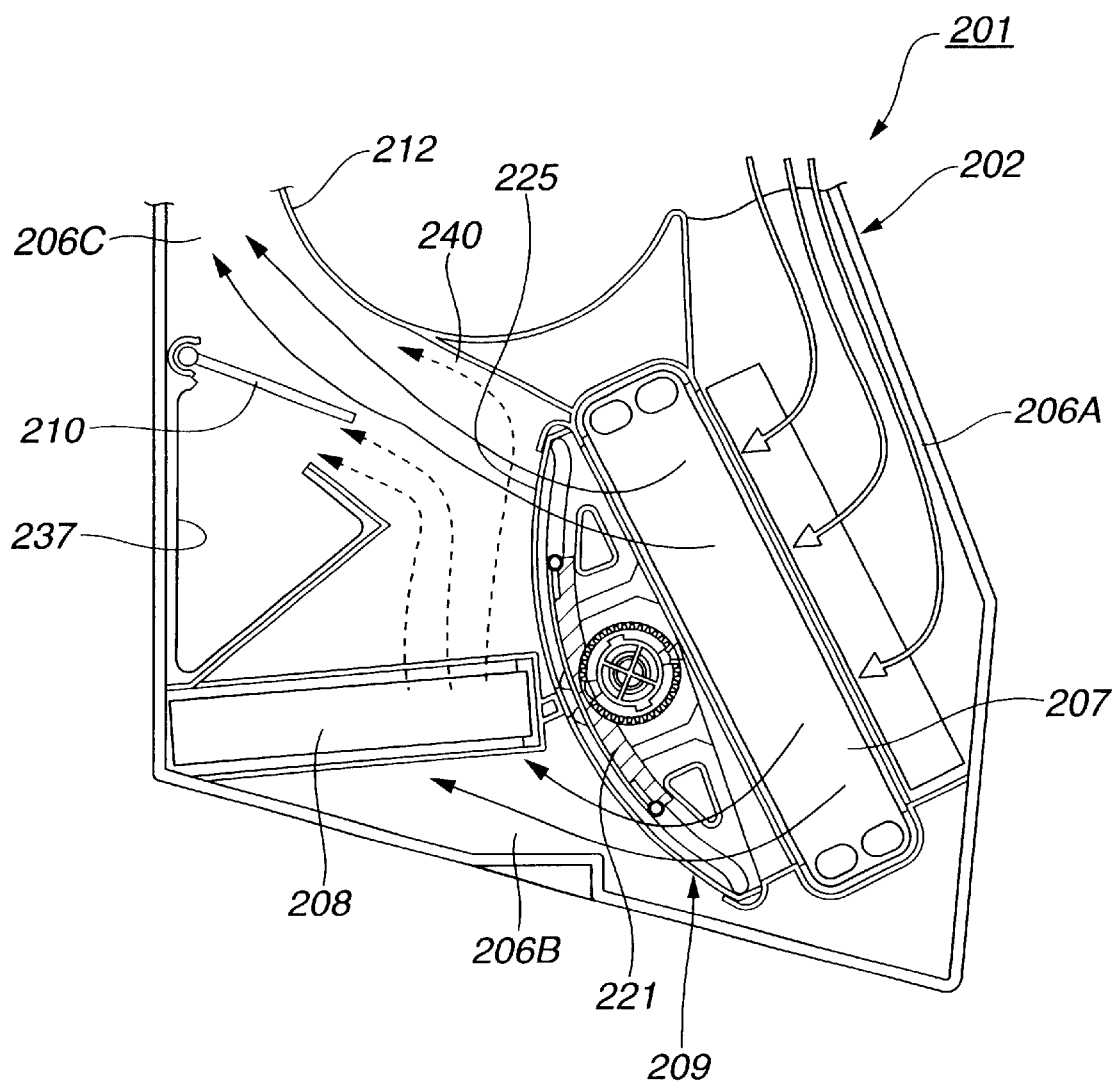
FIG. 22 is a sectional view showing the air conditioner unit of FIG. 16 in a bi-level mode.
Figure 23:
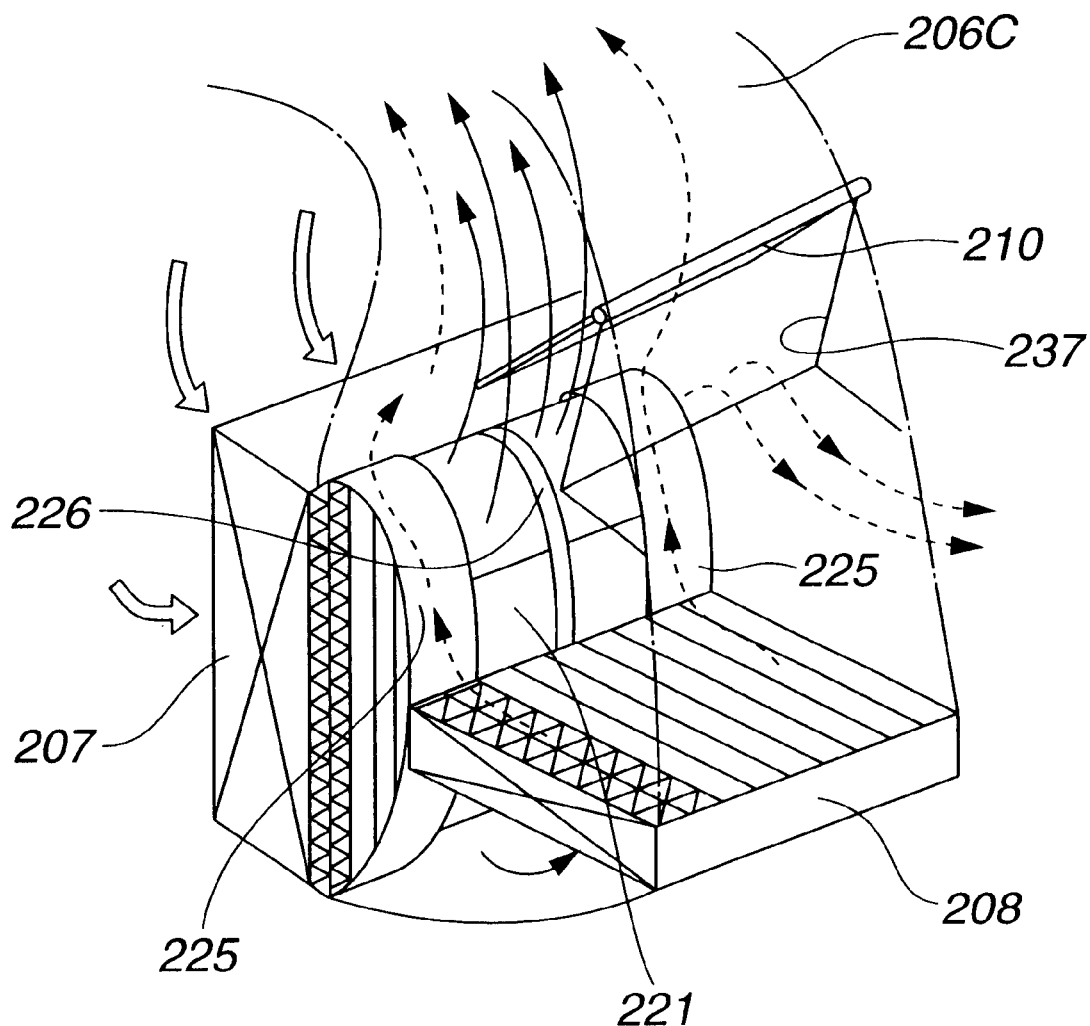
FIG. 23 is a perspective view illustrating the bi-level mode of FIG. 22.
Figure 24:
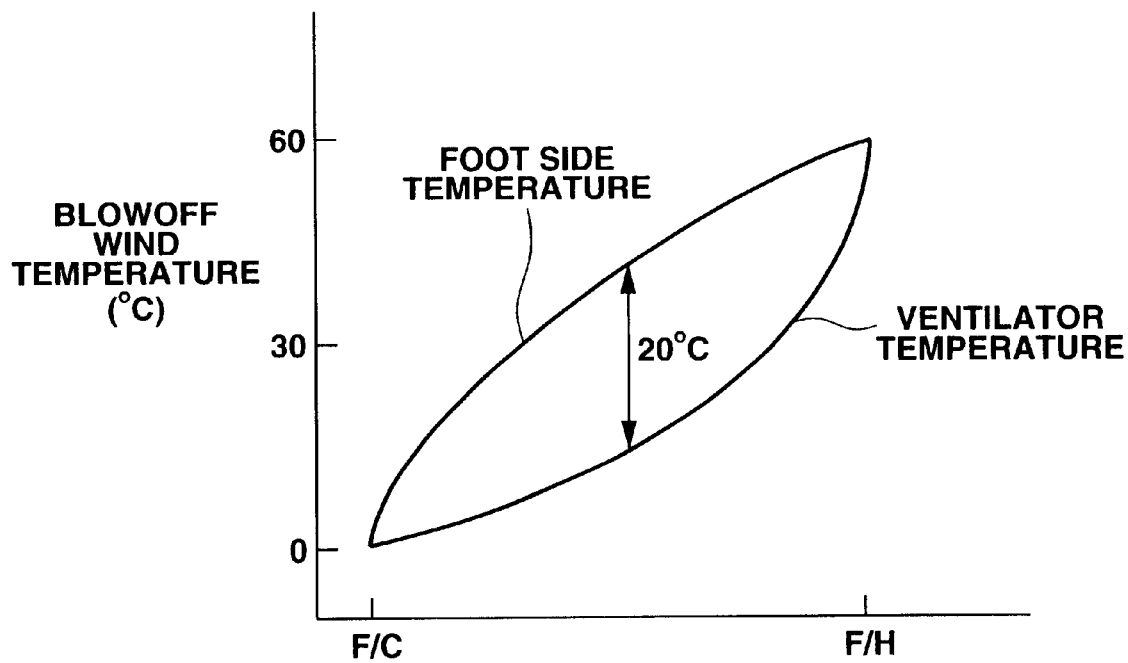
FIG. 24 is a graph showing a characteristic of a blow-off wind temperature of air discharged from the air conditioning system in the bi-level mode in the air conditioning apparatus of FIG. 16.
Figure 27:
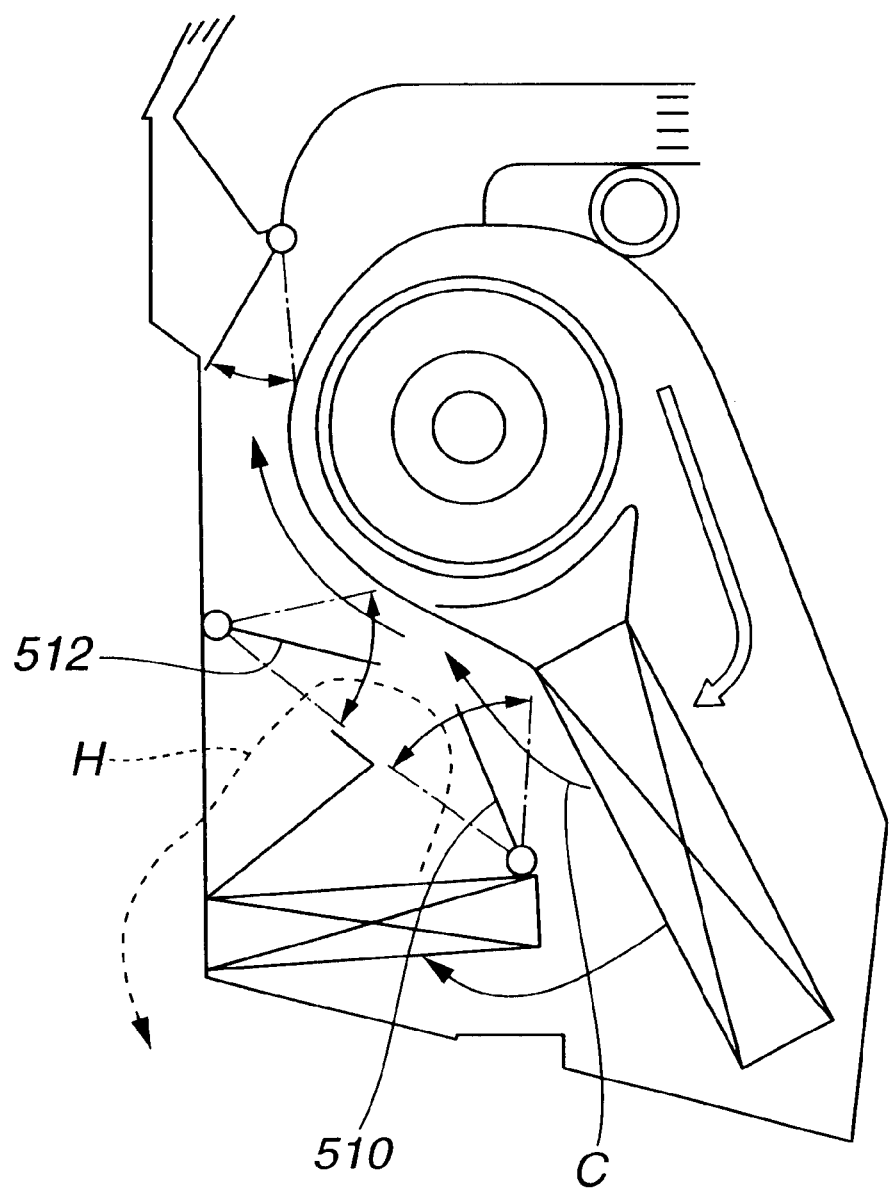
FIG. 27 is a sectional view showing air streams in an air conditioner unit having a swing type air mix door.
Figure 28:
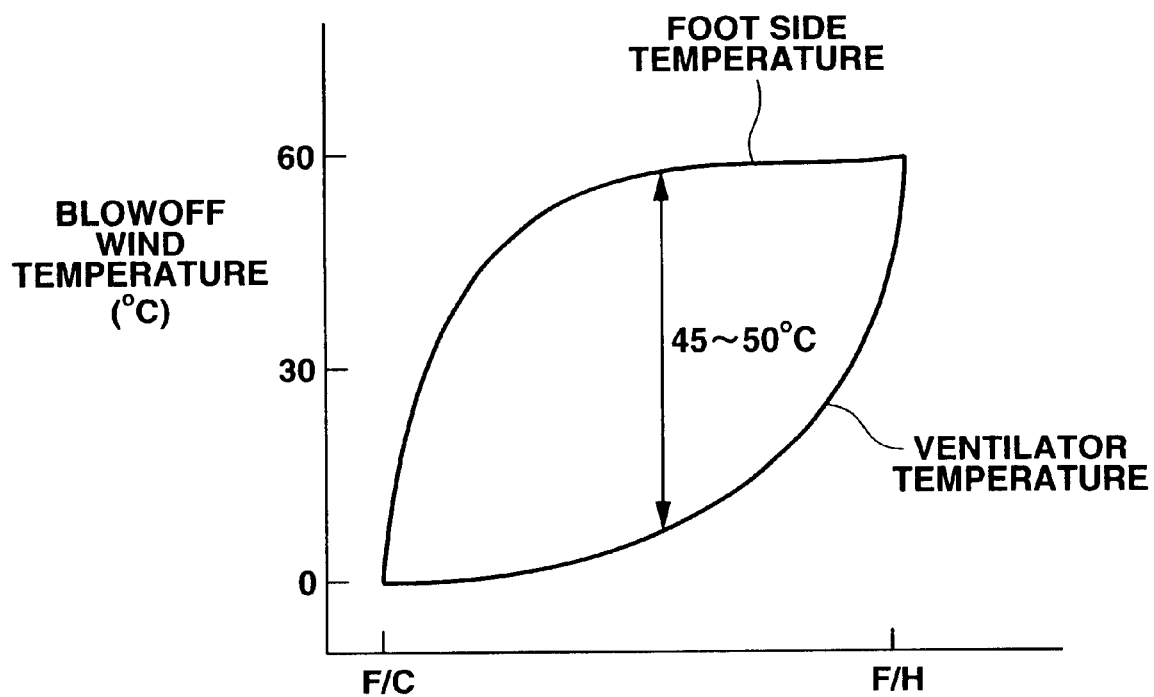
FIG. 28 is a graphs showing a characteristic of a blow-off wind temperature in the air conditioner unit of FIG. 27.

FIG. 22 illustrates the bi-level mode in which the slide plate 221 is in the intermediate position, and the foot door 210 is also in an intermediate position. In this state, the cool air from the cooling heat exchanger 207 passes through both the upper side and lower side of the slide door plate 221 in the intermediate position. Lower air streams through the lower openings 228B enter the heating heat exchanger 208 and become warm air streams, as shown by broken line arrows in FIG. 22. Upper air streams flow out of the upper openings 228A in the form of laminar flow toward the upward passage 206C. The foot door 210 in the intermediate position deflects the warm air streams into the foot outlet passage 237, so that most of the warm air from the heating heat exchanger 208 is introduced into the foot outlet passage 237. Part of the warm air flows upward along the slide door unit 209 and mingles with the cool air in the upper region of the air mix chamber 240, as shown in FIG. 22. As illustrated in perspective in FIG. 23, the warm air flows upward from the heating heat exchanger 208 along the guide plates 225 and 226 of the slide door frame 220 toward the upward passage 206C. In this way, the air conditioner unit 201 functions to mix part of the warm air with the cool air instead of separating the warm air completely from the cool air, and thereby prevents an excessive increase in the temperature difference between the upward air stream toward the upper openings 204 and 205, and the intermediate air stream flowing into the foot outlet passage 237 for foot warming. FIG. 24 shows the temperature difference between the foot side temperature and the ventilator temperature in the air conditioner unit according to this embodiment. The air conditioner unit 201 can prevent an excessive increase in the temperature difference, and improve the comfort in the passenger compartment in the bi-level mode. The temperature difference between the foot side blow off wind and the ventilator wind is readily adjustable by tuning of the guide plates (or ribs) 225 and 226. For comparison, FIG. 28 shows the temperature difference varying between the full cool mode (F/C) and the full hot mode (F/H) in an air conditioner unit shown in FIG. 27. In this unit, the volume of the air mix chamber is smaller. Besides, in the bi-level mode where the two adjacent swing doors 510 and 512 are in the intermediate position, the swing doors 510 and 512 tend to separate a cool air laminar stream C and a warm air laminar stream H as shown in FIG. 27. These are factors to increase the temperature difference between the air stream for ventilation and the air stream for warming the feet of a passenger.

Figure 25:
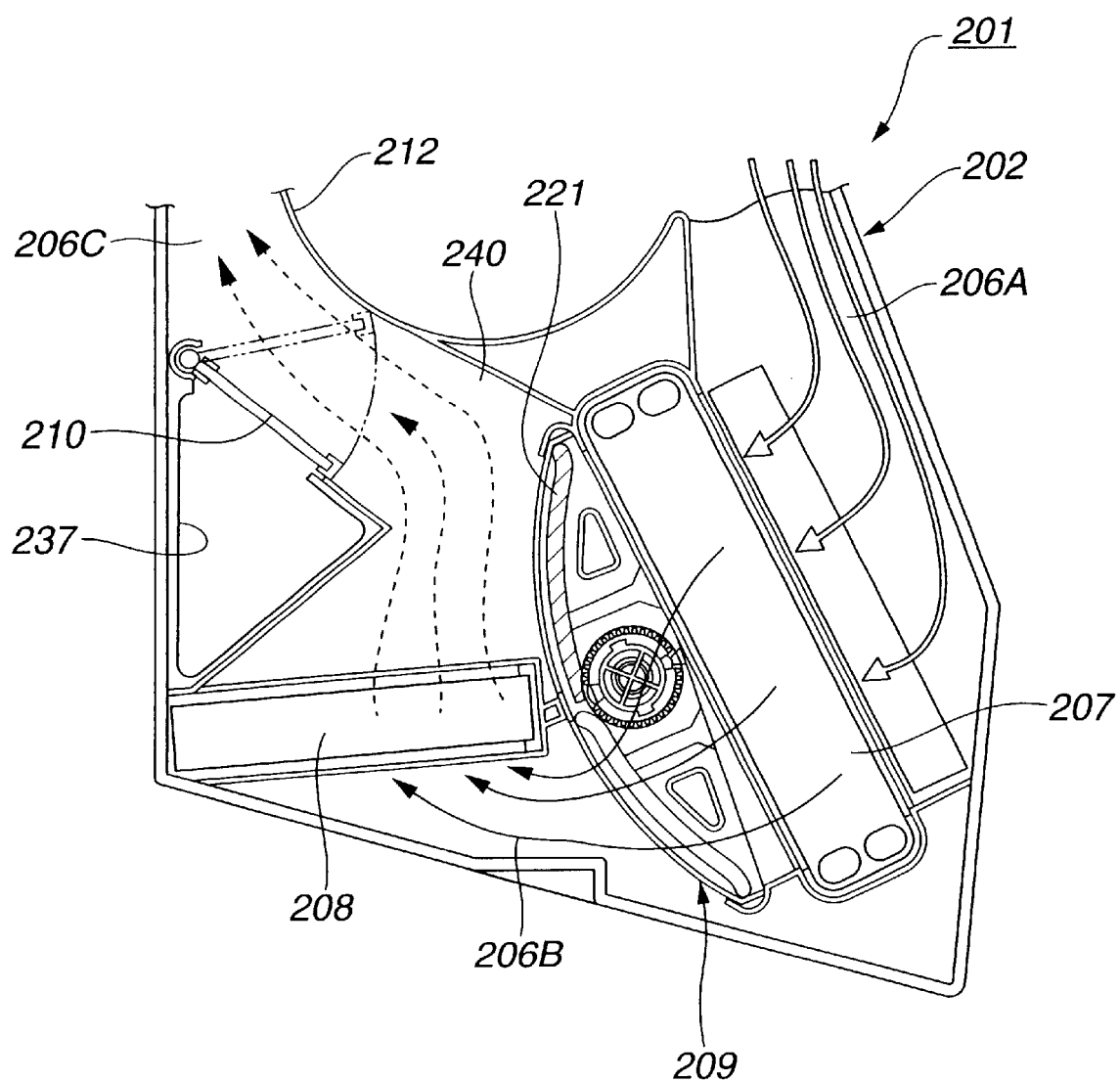
FIG. 25 is a sectional view showing the air conditioner unit of FIG. 16 in a full hot mode.

FIG. 25 shows the slide door unit 209 in the full hot mode in which the slide plate 221 is in the uppermost position fully closing the upper openings 228A of the door frame 220. The air from the cooling heat exchanger 207 is directed and warmed in the heating heat exchanger 208 and guided into the upward passage 206C when the foot door 210 is in the closed position. The foot door 210, if in the open position as shown by two dot chain line in FIG. 25, guides the warm air into the foot outlet passage 237.

In this embodiment, the slide door frame 220 and the slide door plate 221 are formed in a cartridge, which facilitates the production process of the air conditioner unit, improves the working efficiency and reduce the production cost. The slide door cartridge 209 according to this embodiment is specifically suitable for common use in different types of vehicles. The ease of removing the slide door cartridge 209 from the unit case facilitates the collection of classified refuse and the recycling even when the slide door unit 209 and the unit case 201 are made of different plastic materials. The slide motion of the slide door plate 221 is guaranteed by the slide door unit per se.

The slide door cartridge 209 according to this embodiment is compact and hence advantageous for reduction of the height of the arrangement of the heat exchangers 207 and 208 and for reduction of the size of the air conditioner unit.

Figure 26:
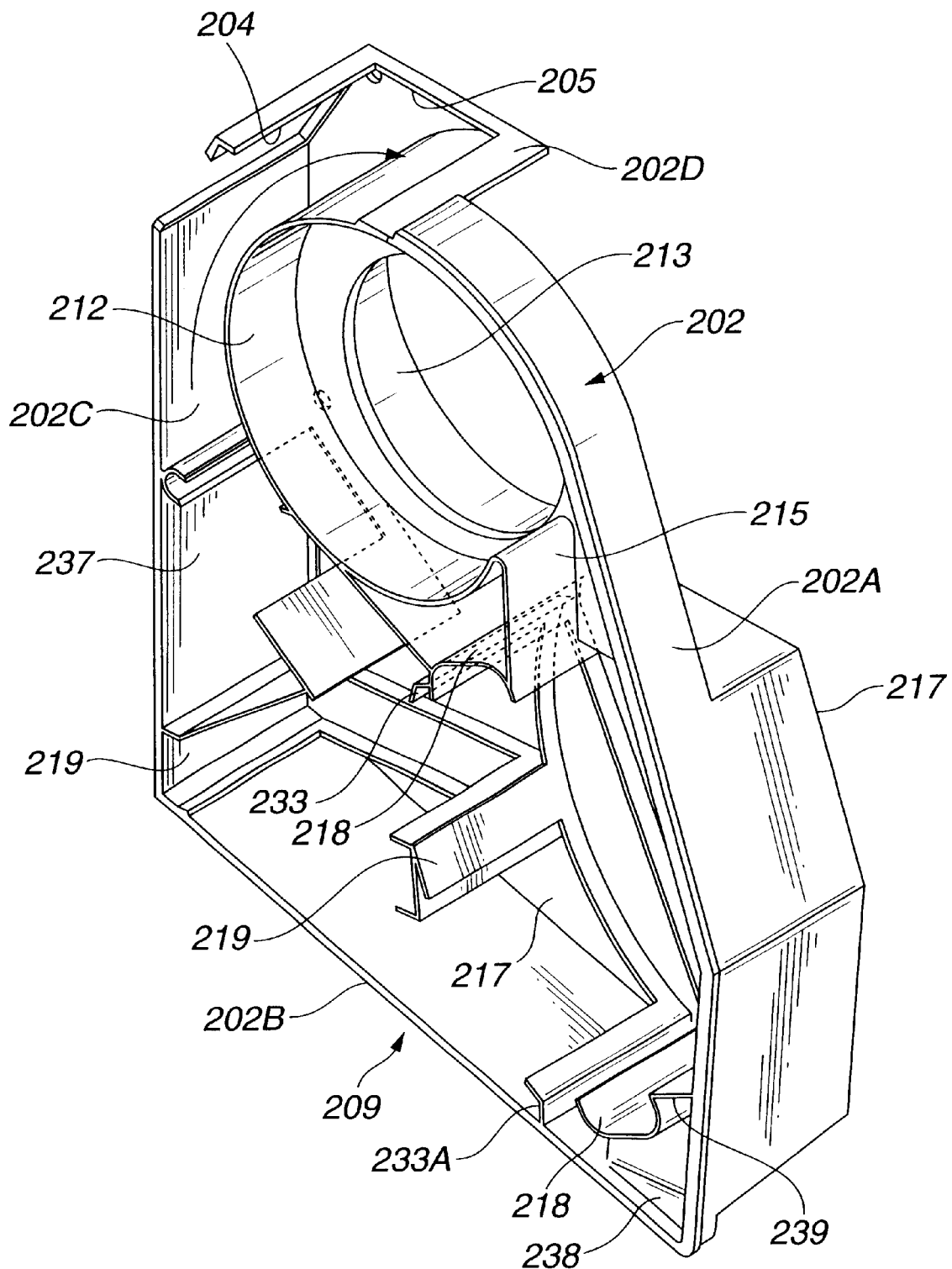
FIG. 26 is a perspective view showing a half of an air conditioner unit case in a second practical example according to the second embodiment.

FIG. 26 shows a variation according to the second embodiment. The point of difference from FIG. 17 resides in a lower support bracket 233A for supporting the lower end of the slide door unit 209. The lower support bracket 233A is separate from the lower support bracket 218, and projects upward from the lower wall 202B.

In the illustrated examples of the second embodiment, the slide door unit 209 is in the form of a cartridge. However, it is possible to form the door frame of the slide door unit 209 by partition walls of the unit case 202. In this case, the slide door plate 221 is received slidably in a frame structure formed in the unit case. In the second embodiment, it is optional to employ a flat door frame and a flat door plate instead of the curved door frame 220 and the curved door plate 221.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An air conditioning apparatus for a vehicle, comprising:
    a blower fan;
    a cooling heat exchanger;
    a heating heat exchanger; and
    a unit case enclosing the blower fan, the cooling heat exchanger and the heating heat exchanger, and defining, in the unit case, an air conditioning passage for conveying air from the blower fan through the cooling heat exchanger and the heating heat exchanger, to an upper outlet opening, the air conditioning passage comprising an upstream passage section extending downward on a first side of the blower fan to convey the air from the blower fan downward, an intermediate passage section extending under the blower fan in a first direction from the first side to a second side of the blower fan, and a downstream passage section extending upward on the second side of the blower fan to the upper outlet opening for directing the air over the blower fan in a second direction from the second side toward the first side,
    wherein the downstream passage section comprises an upper outlet subsection extending to the upper outlet opening, and the upper outlet subsection is so bent as to direct the air through the upper outlet opening along the second direction from the second side toward the first side of the blower fan.

2. An air conditioning apparatus for a vehicle, comprising:
    a blower fan;
    a cooling heat exchanger;
    a heating heat exchanger; and
    a unit case enclosing the blower fan, the cooling heat exchanger and the heating heat exchanger, and defining, in the unit case, an air conditioning passage for conveying air from the blower fan through the cooling heat exchanger and the heating heat exchanger, to an upper outlet opening, the air conditioning passage comprising an upstream passage section extending downward on a first side of the blower fan to convey the air from the blower fan downward, an intermediate passage section extending under the blower fan in a first direction from the first side to a second side of the blower fan, and a downstream passage section extending upward on the second side of the blower fan to the upper outlet opening for directing the air over the blower fan in a second direction from the second side toward the first side;
    wherein the unit case includes a first side wall extending on the first side of the blower fan and defining the upstream passage section, and a second side wall extending on the second side of the blower fan and defining the downstream passage section; and
    wherein the first side wall is an upright wall on a passenger compartment side, and the second side wall is an upright wall on an engine room side.

3. The air conditioning apparatus according to claim 2, wherein the air conditioning apparatus further comprises a ventilator duct extending from the upper outlet opening along the second direction over the unit case to distribute the air into a passenger compartment of the vehicle.

4. The air conditioning apparatus according to claim 3, wherein the ventilator duct comprises a center branch extending from the upper outlet opening in the second direction over the unit case to a center ventilator aperture and left and right branches extending from the upper outlet opening on both sides of the center branch, respectively, to left and right ventilator apertures.

5. A unit case for an air conditioning apparatus for a vehicle, the unit case comprising:
    a blower housing having a surrounding wall for surrounding a blower fan in the unit case;
    a first bracket for supporting a cooling heat exchanger in the unit case;
    a second bracket for supporting a heating heat exchanger in the unit case;
    a first side wall extending on a first side of the blower housing and defining an upstream passage section of an air conditioning passage for conveying air from the blower fan through the cooling heat exchanger and the heating heat exchanger, the upstream passage section extending downward on the first side to convey the air from the blower fan downward, the first side being a passenger compartment side, so that the first side wall is located between the blower fan and a passenger compartment of the vehicle when the unit case is installed in the vehicle;
    a lower wall defining an intermediate passage section of the air conditioning passage under the blower housing, the intermediate passage section extending in a first direction from the first side to a second side of the blower housing;
    a second side wall extending on the second side of the blower housing and defining a downstream passage section of the air conditioning passage, the downstream passage section extending upward on the second side of the blower housing, the second side being an engine room side, so that the second side wall is located between the blower fan and an engine room of the vehicle when the unit case is installed in the vehicle; and
    an upper wall having an upper ventilator outlet opening for letting out the air from the downstream passage section along a second direction from the second side toward the first side of the blower housing for ventilation of a passenger compartment of the vehicle.

6. The unit case according to claim 5, wherein the first side wall is an upright wall on the passenger compartment side, the second side wall is an upright wall on the engine room side, the first bracket comprises upper and lower brackets for supporting upper and lower ends respectively of the cooling heat exchanger in an angled position angled toward the second side wall such that the upper end is closer to the second side wall than the lower end is, and the second bracket comprises far and near brackets for supporting a far end and a near end respectively of the heating heat exchanger in a lying position extending from the far end to the near end toward an intermediate point between the upper and lower ends of the cooling heat exchanger.

7. An air conditioning apparatus adapted to be installed between a passenger compartment and an engine compartment of a vehicle, the air conditioning apparatus comprising:

a blower fan;

a cooling heat exchanger;

a heating heat exchanger; and a unit case enclosing the blower fan, the cooling heat exchanger and the heating heat exchanger, and defining, in the unit case, an air conditioning passage for conveying air from the blower fan through the cooling heat exchanger and the heating heat exchanger, to an upper outlet opening, the air conditioning passage comprising an upstream passage section extending downward on a first side of the blower fan to convey the air from the blower fan downward, an intermediate passage section extending under the blower fan in a first direction from the first side to a second side of the blower fan, and a downstream passage section extending upward on the second side of the blower fan to the upper outlet opening for directing the air over the blower fan in a second direction from the second side toward the first side, wherein the first side is a passenger compartment side, the second side is an engine room side, and the unit case includes a first side wall having an outside surface adapted to face the passenger compartment of the vehicle and an inside surface defining the upstream passage section, and a second side wall having an outside surface adapted to face the engine compartment and an inside surface defining the downstream passage section.

8. The air conditioning apparatus according to claim 7, wherein the unit case further comprises an upper wall having the upper outlet opening for letting out the air from the downstream passage section along the second direction from the second side toward the first side of the blower fan, and the cooling heat exchanger is disposed upstream of the heating heat exchanger in the intermediate passage section of the air conditioning passage.

9. The air conditioning apparatus according to claim 8, wherein the cooling heat exchanger is arranged to allow the air from the blower fan to pass, through the cooling heat exchanger, along the first direction from the first side to the second side, the heating heat exchanger is spaced from the cooling heat exchanger, and the heating heat exchanger extends from a first end to a second end along a first imaginary line bisecting said first end and said second end of the heating heat exchanger and intersecting the cooling heat exchanger.

10. The air conditioning apparatus according to claim 9, wherein the cooling heat exchanger extends downward from an upper end to a lower end along a second imaginary line bisecting said upper end and said lower end of said cooling heat exchanger, the heating heat exchanger extends from said first end to said second end of the heating heat exchanger toward the cooling heat exchanger along the first imaginary line, the cooling heat exchanger is positioned at an angle from an imaginary vertical plane, toward the heating heat exchanger, and the heating heat exchanger slopes down from said second end to said first end of the heating heat exchanger.

11. The air conditioning apparatus according to claim 10, wherein a leaning angle between an imaginary vertical reference plane and the second imaginary line along which the cooling heat exchanger extends is equal to or greater than a sloping angle between an imaginary horizontal reference plane and the first imaginary line along which the heating heat exchanger extends.

12. The air conditioning apparatus according to claim 10, wherein a leaning angle between an imaginary vertical reference plane and the second imaginary line along which the cooling heat exchanger extends is greater than zero and smaller than or equal to about 30°, and a sloping angle between an imaginary horizontal reference plane and the first imaginary line along which the heating heat exchanger extends is greater than zero and smaller than or equal to about 10°.

13. The air conditioning apparatus according to claim 8, wherein the upper outlet opening is formed in a region adjacent to the second side wall of the case, and the air conditioning apparatus further comprises an upper door for opening and closing the upper outlet opening.

14. The air conditioning apparatus according to claim 8, wherein the heating heat exchanger extends from a far end to a near end toward the cooling heat exchanger, a bypass passage is formed between the cooling heat exchanger and the near end of the heating heat exchange, the air conditioning apparatus further comprises an air mix door for controlling a proportion of bypass air flowing through the bypass passage bypassing the heating heat exchanger and a proportion of warm air passing through the heating heat exchanger, and the air mix door is arranged to close and open the bypass passage.

15. The air conditioning apparatus according to claim 14, wherein the cooling heat exchanger is positioned at an angle from an imaginary vertical plane, the heating heat exchanger extends approximately horizontally, and the downstream passage section extends upward from the heating heat exchanger.

16. The air conditioning apparatus according to claim 15, wherein the unit case further comprises a first guide wall defining a warm air passage extending from the heating heat exchanger to a confluence region at which the bypass passage and the warm air passage join, a second guide wall defining a conditioned air passage extending from the confluence region to the downstream passage section.

17. The air conditioning apparatus according to claim 16, wherein the first guide wall projects along an upward oblique direction from a first base position on the second side wall to an apex position toward the first side wall, the second guide wall projects along a downward oblique direction from a second base position on the second side wall to the apex position at which projecting ends of the first and second guide walls are connected together.

18. The air conditioning apparatus according to claim 16, wherein the second guide wall is formed with an intermediate outlet opening opening into an intermediate air outlet passage, and the first and second guide walls and the second side wall forms the intermediate air outlet passage within the case.

19. The air conditioning apparatus according to claim 18, wherein the door frame of the slide door unit comprises a guide plate for guiding part of the air from the heating heat exchanger upward toward the upper end of the door frame.

20. The air conditioning apparatus according to claim 8, wherein the unit case comprises a drain reservoir located below the cooling heat exchanger and located between the first side wall and an outlet side of the cooling heat exchanger.

21. The air conditioning apparatus according to claim 20, wherein the unit case comprises a partition separating the drain reservoir from the upstream passage section.

22. The air conditioning apparatus according to claim 21, wherein the partition connects the first side wall and a support wall for supporting the cooling heat exchanger, and thereby reinforces the support wall.

23. The air conditioning apparatus according to claim 8, wherein the unit case further comprises:

a blower housing wall extending around the blower fan, said blower housing wall including a blower outlet opening adjacent to the first side wall for discharging the air from the blower fan into the upstream passage section of the air conditioning passage;

an upper support bracket supporting an upper end of the cooling heat exchanger; and first and second housing support walls connecting the upper support bracket and the blower housing wall, the first housing support wall defining the upstream passage section with the first side wall, the second housing support wall extending from the upper support bracket toward the downstream passage section to guide the air into the downstream passage section.

24. The air conditioning apparatus according to claim 23, wherein the first and second housing support walls, the upper support bracket and the blower housing wall are connected to form a box girder extending along an axis of rotation of the blower fan.

25. The air conditioning apparatus according to claim 8, wherein the air conditioning apparatus further comprises an air filter disposed on an upstream side of the cooling heat exchanger.

26. The air conditioning apparatus according to claim 25, wherein the air filter comprises a filter frame comprising an upper side formed with an air inlet.

27. The air conditioning apparatus according to claim 8, wherein, the air conditioning apparatus further comprises an air mix door unit disposed between the cooling heat exchanger and the heating heat exchanger, and the air mix door unit is a slide door unit for directing air from the cooling heat exchanger to at least one of an upstream side and a downstream side of the heating heat exchanger for mixing warm air and cool air in a mixing region downstream of the heating heat exchanger.

28. The air conditioning apparatus according to claim 27, wherein the cooling heat exchanger extends from an upper end to a lower end, the slide door unit is superposed on the cooling heat exchanger, and the heating heat exchanger extends toward the cooling heat exchanger, along a first straight line intersecting the cooling heat exchanger at an intermediate position of the cooling heat exchanger between the upper and lower ends of the cooling heat exchanger.

29. The air conditioning apparatus according to claim 27, wherein the slide door unit extends from an upper end to a lower end, and the heating heat exchanger extends along the first line to a middle of the slide door unit between the upper and lower ends of the slide door unit.

30. The air conditioning apparatus according to claim 27, wherein the slide door unit comprises a door frame defining an air passage, a slide plate slidable up and down in the frame, and a drive mechanism for sliding the slide plate.

31. The air conditioning apparatus according to claim 30, wherein the slide plate divides a doorway defined by the door frame into an upper opening section and a lower opening section, and varies a ratio between an area of the upper opening section and an area of the lower opening section by sliding up and down in the door frame.

32. The air conditioning apparatus according to claim 31, wherein the slide plate of the slide door unit fully closes the upper opening section to direct the air from the cooling heat exchanger only to the upstream side of the heating heat exchanger when the slide is in an uppermost position, and the slide plate fully closes the lower opening section to prevent the air from the cooling heat exchanger from passing through the heating heat exchanger when the slide plate is in a lowermost position.

33. The air conditioning apparatus according to claim 30, wherein the door frame and the slide plate of the slide door unit are both curved so as to bulge toward a downstream side so that a space is formed between the slide plate and the cooling heat exchanger.

34. The air conditioning apparatus according to claim 30, wherein the unit case further comprises an intermediate wall defining an intermediate outlet air passage and having an intermediate opening into the intermediate outlet passage at an intermediate position downstream of the heating heat exchanger, the air conditioning apparatus further comprising an intermediate door for opening and closing the intermediate opening and the downstream passage section.

35. The air conditioning apparatus according to claim 34, wherein the intermediate door is a swing door swingable on a swing axis, and the intermediate door extends from the swing axis to a swing end toward the first side wall.

36. The air conditioning apparatus according to claim 35, wherein the heating heat exchanger is located below a straight line connecting the swing axis of the intermediate door and the lower end of the air passage in the cooling heat exchanger.

* * * * *